US012495867B2

United States Patent
Case et al.

(10) Patent No.: US 12,495,867 B2
(45) Date of Patent: *Dec. 16, 2025

(54) BLADDERS, FOOTWEAR UPPERS INCLUDING BLADDERS, AND ARTICLES OF FOOTWEAR INCLUDING BLADDERS IN THE UPPER

(71) Applicant: NIKE, Inc., Beaverton, OR (US)

(72) Inventors: Patrick R. Case, Portland, OR (US); Yoon Jeong Choi, Portland, OR (US); James Molyneux, Portland, OR (US); Colin Runkle, Portland, OR (US); Bryan K. Youngs, Beaverton, OR (US)

(73) Assignee: NIKE, Inc., Beaverton, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/766,040

(22) Filed: Jul. 8, 2024

(65) Prior Publication Data

US 2024/0358119 A1    Oct. 31, 2024

Related U.S. Application Data

(63) Continuation of application No. 17/969,317, filed on Oct. 19, 2022, now Pat. No. 12,053,053.

(Continued)

(51) Int. Cl.
    *A43B 23/02*    (2006.01)
    *A43B 21/28*    (2006.01)
    (Continued)

(52) U.S. Cl.
    CPC .......... *A43B 23/029* (2013.01); *A43B 23/028* (2013.01); *A43B 21/28* (2013.01);
    (Continued)

(58) Field of Classification Search
    CPC .. A43B 23/029; A43B 23/028; A43C 11/1493
    See application file for complete search history.

(56) References Cited

U.S. PATENT DOCUMENTS

| | | | |
|---|---|---|---|
| 4,361,969 A | 12/1982 | Vermonet | |
| RE32,585 E * | 2/1988 | Antonious | A43C 11/1493 36/114 |

(Continued)

FOREIGN PATENT DOCUMENTS

| | | |
|---|---|---|
| EP | 0579786 B1 | 4/2003 |
| EP | 3547865 A1 | 10/2019 |

(Continued)

OTHER PUBLICATIONS

Dunne, Carey, Reebok to Reintroduce Inflatable "Pump" Sneakers, Fast Company, fastcompany.com, Sep. 28, 2020, https://web.archive.org/web/20200928224556/https://www.fastcompany.com/3043239/reebok-to-teintroduce-inflatable-pump-running-shoes, original article dated Mar. 5, 2015.

(Continued)

*Primary Examiner* — Ted Kavanaugh
(74) *Attorney, Agent, or Firm* — Banner & Witcoff, Ltd.

(57) ABSTRACT

Footwear uppers include a footwear upper base formed from one or more component parts and including: (i) an instep region including at least one of a tongue base region or instep base region and (ii) a heel-containing region. A bladder is engaged with the footwear upper. The bladder includes: (i) at least a first instep chamber engaged with the instep region, (ii) at least a first heel and/or ankle support chamber engaged with the heel-containing region, and (iii) a first fluid line connecting the first instep chamber and the first heel and/or ankle support chamber and placing the first instep chamber in fluid communication with the first heel and/or ankle support chamber. Fluid moving from the first instep chamber to the first heel and/or ankle support cham- (Continued)

ber (e.g., under force applied by a footwear securing strap) provides further support for the wearer's heel and/or ankle.

20 Claims, 23 Drawing Sheets

Related U.S. Application Data

(60) Provisional application No. 63/277,903, filed on Nov. 10, 2021, provisional application No. 63/277,941, filed on Nov. 10, 2021.

(51) Int. Cl.
*A43B 21/32* (2006.01)
*A43C 11/14* (2006.01)

(52) U.S. Cl.
CPC ............. *A43B 21/285* (2013.01); *A43B 21/32* (2013.01); *A43B 23/02* (2013.01); *A43C 11/14* (2013.01)

(56) References Cited

U.S. PATENT DOCUMENTS

| | | | |
|---|---|---|---|
| 4,805,601 A | 2/1989 | Eischen, Sr. | |
| 5,113,599 A | 5/1992 | Cohen et al. | |
| 5,257,470 A | 11/1993 | Auger et al. | |
| 5,343,638 A | 9/1994 | Legassie et al. | |
| 5,400,529 A | 3/1995 | Bell et al. | |
| 5,430,961 A | 7/1995 | Faulconer et al. | |
| 5,765,298 A | 6/1998 | Potter et al. | |
| 5,893,219 A | 4/1999 | Smith et al. | |
| 6,014,823 A | 1/2000 | Lakic | |
| 6,195,914 B1 | 3/2001 | Otis | |
| 6,513,265 B2 | 2/2003 | Hanks | |
| 6,557,274 B2 | 5/2003 | Litchfield et al. | |
| 6,775,929 B2 | 8/2004 | Katz et al. | |
| 7,181,867 B2 | 2/2007 | Litchfield et al. | |
| 7,395,617 B2 | 7/2008 | Christensen et al. | |
| 7,478,488 B1 | 1/2009 | Davis et al. | |
| 7,735,241 B2 | 6/2010 | Marvin et al. | |
| 8,151,489 B2 | 4/2012 | Marvin et al. | |
| 8,561,323 B2 | 10/2013 | Ellis | |
| 9,351,536 B2 | 5/2016 | Schindler et al. | |
| 9,687,045 B2 | 6/2017 | Leary et al. | |
| 9,788,601 B2 | 10/2017 | Caston, Jr. | |
| 10,051,919 B2 | 8/2018 | Leary et al. | |
| 10,251,450 B2 | 4/2019 | Marvin et al. | |
| 10,258,102 B2 | 4/2019 | Hsu | |
| 10,499,707 B2 | 12/2019 | Hobson et al. | |
| 10,842,229 B2 | 11/2020 | Mou et al. | |
| 11,564,449 B2 | 1/2023 | Braithwaite et al. | |
| 11,583,034 B2 | 2/2023 | Braithwaite et al. | |
| 11,653,712 B2 | 5/2023 | Costa et al. | |
| 12,053,053 B2 * | 8/2024 | Case .................... | A43B 21/32 |
| 2004/0003517 A1 | 1/2004 | Marvin et al. | |
| 2005/0028404 A1 | 2/2005 | Marvin et al. | |
| 2013/0138028 A1 | 5/2013 | Gerber et al. | |
| 2016/0249706 A1 | 9/2016 | Leary et al. | |
| 2017/0035148 A1 | 2/2017 | Marvin et al. | |
| 2017/0332736 A1 * | 11/2017 | Casas ................ | A43C 11/1493 |
| 2017/0360155 A1 | 12/2017 | Leary et al. | |
| 2018/0110286 A1 | 4/2018 | Vuong | |
| 2019/0110557 A1 | 4/2019 | Hobson et al. | |
| 2020/0189171 A1 | 6/2020 | Chan et al. | |
| 2021/0120915 A1 | 4/2021 | Panian | |
| 2021/0368941 A1 | 12/2021 | Chen et al. | |
| 2022/0104582 A1 | 4/2022 | Christensen et al. | |
| 2022/0330657 A1 | 10/2022 | Bishop et al. | |
| 2023/0141164 A1 | 5/2023 | Case et al. | |
| 2023/0141325 A1 | 5/2023 | Case et al. | |
| 2023/0146597 A1 | 5/2023 | Case et al. | |
| 2023/0147306 A1 | 5/2023 | Case et al. | |

FOREIGN PATENT DOCUMENTS

| | | |
|---|---|---|
| WO | 9857562 A1 | 12/1998 |
| WO | 2014121565 A1 | 8/2014 |
| WO | 2017024166 A1 | 2/2017 |

OTHER PUBLICATIONS

Lloyd, Barbara, On Your Own; An Inflatable Sneaker, The New York Times, nytimes.com, Nov. 23, 2010, https://web.archive.org/web/20101123163116.https://www.nytimes.com/1989/03/27/sports/on-your-own-an-inflatable-sneaker.html, original article dated Mar. 27, 1989.

DePaula, Nick, Here's a Rare Look at the Original Nike Air Pressure, Sole Collector, solecollector.com, Mar. 17, 2016, https://web.archive.org/web/20160317011120/https://solecollector.com/news/2016/01/nike-air-pressure-1989-original.

Jan. 17, 2023 (WO) International Search Report and Written Opinion—App PCT/US2022/078349, 11 pages.

Jan. 17, 2023 (WO) International Search Report and Written Opinion—App PCT/US2022/078357, 24 pages.

\* cited by examiner

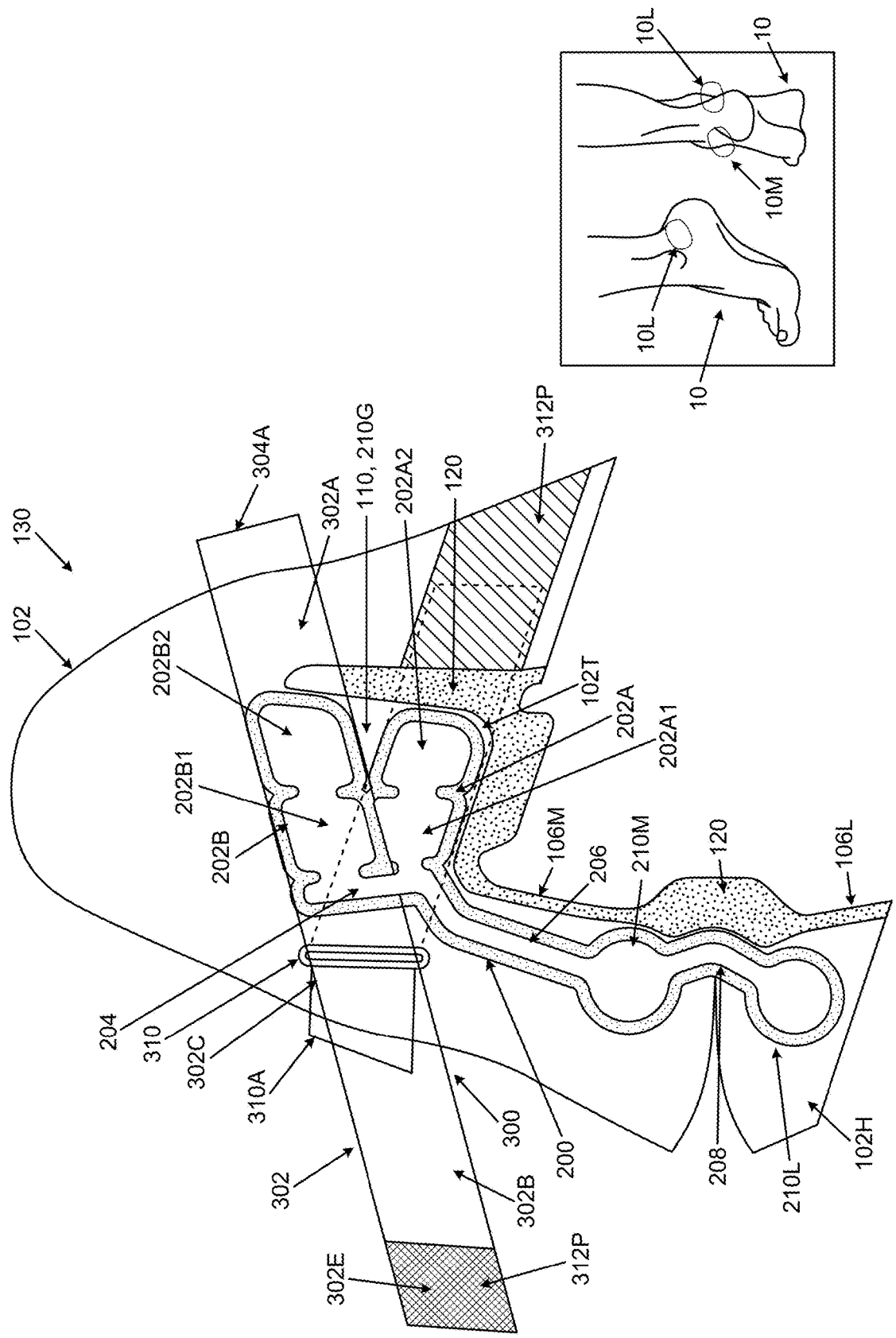

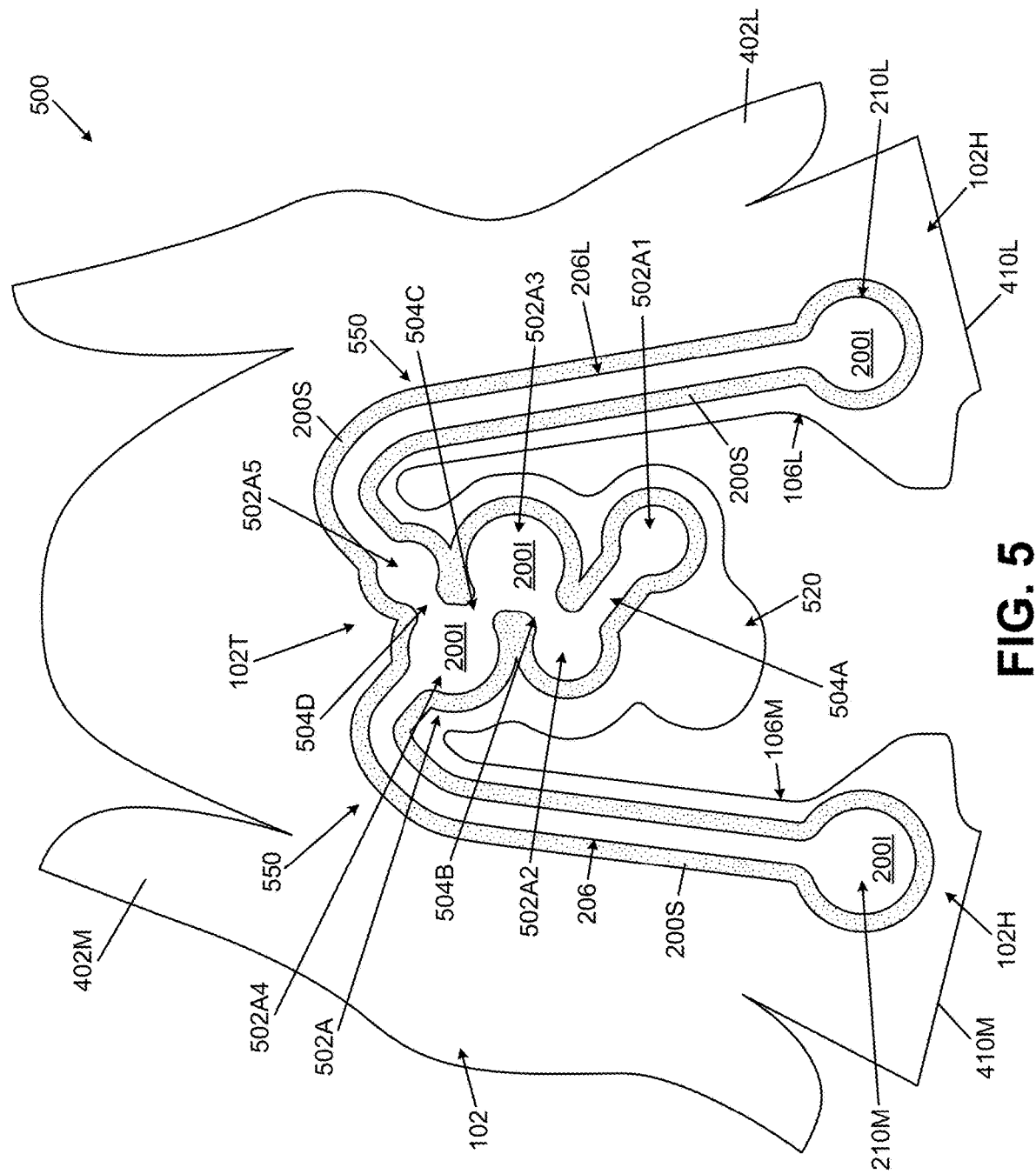

BLADDERS, FOOTWEAR UPPERS INCLUDING BLADDERS, AND ARTICLES OF FOOTWEAR INCLUDING BLADDERS IN THE UPPER

RELATED APPLICATION DATA

This application is a continuation of co-pending U.S. patent application Ser. No. 17/969,317 filed Oct. 19, 2022 and entitled "Bladders, Footwear Uppers Including Bladders, and Articles of Footwear Including Bladders in the Upper," which application is a U.S. Non-Provisional Patent Application based on (a) U.S. Provisional Patent Appln. No. 63/277,903 filed Nov. 10, 2021 and entitled "Bladders, Footwear Uppers Including Bladders, and Articles of Footwear Including Bladders in the Upper" and (b) U.S. Provisional Patent Appln. No. 63/277,941 filed Nov. 10, 2021 and entitled "Bladders, Footwear Uppers Including Bladders, and Articles of Footwear Including Bladders in the Upper." Each of U.S. patent application Ser. No. 17/969,317, U.S. Provisional Patent Appln. No. 63/277,903, and U.S. Provisional Patent Appln. No. 63/277,941 is entirely incorporated herein by reference.

FIELD OF THE INVENTION

The present invention relates to bladders for footwear uppers, footwear uppers including the bladders, articles of footwear including the bladders, and/or methods of making and using such bladders, uppers, and/or articles of footwear. In some aspects of this technology, the bladders will include bladder chambers and fluid lines configured to move fluid to locations to provide support for a wearer's foot, e.g., heel and/or ankle support.

BACKGROUND

Conventional articles of athletic footwear include two primary elements, an upper and a sole structure. The upper may provide a covering for the foot that securely receives and positions the foot with respect to the sole structure. In addition, the upper may have a configuration that protects the foot and provides ventilation, thereby cooling the foot and removing perspiration. The sole structure may be secured to a lower surface of the upper and generally is positioned between the foot and any contact surface. In addition to attenuating ground reaction forces and absorbing energy, the sole structure may provide traction and control potentially harmful foot motion, such as over pronation.

The upper forms a void on the interior of the footwear for receiving the foot. The void has the general shape of the foot, and access to the void is provided at an ankle opening. Accordingly, the upper extends over the instep and toe areas of the foot, along the medial and lateral sides of the foot, and around the heel area of the foot. A lacing system often is incorporated into the upper to allow users to selectively change the size of the ankle opening and to permit the user to modify certain dimensions of the upper, particularly girth, to accommodate feet with varying proportions. In addition, the upper may include a tongue that extends under the lacing system to enhance the comfort of the footwear (e.g., to moderate pressure applied to the foot by the laces). The upper also may include a heel counter to limit or control movement of the heel.

SUMMARY

This Summary is provided to introduce some general concepts relating to this technology in a simplified form that are further described below in the Detailed Description. This Summary is not intended to identify key features or essential features of the invention.

Aspects of this technology relate to bladders for footwear uppers, footwear uppers including the bladders, articles of footwear including the bladders, and/or methods of making and using such bladders, uppers, and/or articles of footwear, e.g., of the types described and/or claimed below and/or of the types illustrated in the appended drawings. In some aspects of this technology, the bladders will include bladder chambers and fluid lines configured to move fluid (e.g., when the footwear is secured to a wearer's foot) to locations to provide support for a wearer's foot, e.g., heel and/or ankle support. Such bladders, uppers, and/or articles of footwear may include any one or more structures, parts, features, properties, and/or combination(s) of structures, parts, features, and/or properties of the examples described and/or claimed below and/or of the examples illustrated in the appended drawings.

Some more specific aspects of this technology relate to bladders, e.g., for inclusion in footwear uppers, that include: (a) a first thermoplastic sheet; (b) a second thermoplastic sheet facing the first thermoplastic sheet; and (c) a continuous outer perimeter seam sealing the first thermoplastic sheet to the second thermoplastic sheet. The continuous outer perimeter seam defines a sealed interior volume between the first thermoplastic sheet and the second thermoplastic sheet. In some examples of this technology, this continuous outer perimeter seam extends continuously to form the sealed interior volume to include a bladder chamber that underlies at least a portion of a footwear securing system (e.g., straps, laces, etc.) at an instep area of the footwear upper to moderate force applied to a wearer's instep by the securing system.

Additionally or alternatively, in some examples of this technology, the continuous outer perimeter seam of the bladder may extend to form the sealed interior volume to include: (i) one or more fluid supply chambers having at least a first major surface formed by the first thermoplastic sheet, (ii) one or more heel and/or ankle support chambers, and (iii) one or more fluid lines connecting the fluid supply chamber(s) and the one or more heel and/or ankle support chambers through the sealed interior volume. In use, fluid may move from the fluid supply chamber(s) to at least one heel and/or ankle support chamber (via at least one fluid line) to increase fluid volume and/or pressure in the heel and/or ankle support chamber(s). The increased fluid volume and/or pressure provides additional support for the heel and/or ankle area(s) of a wearer's foot and/or may improve comfort and/or fit (e.g., by eliminating at least some excess open space within the footwear upper). The sealed interior volume may contain a fixed mass of fluid (e.g., the interior volume may be a closed volume with no functional fluid inlet or fluid outlet to/from the interior volume). The fluid may move in the sealed interior volume without the need of a pump (e.g., without a manual, mechanical, and/or electronic pump device).

Additional aspects of this technology relate to footwear uppers incorporating bladders, e.g., of the types described above, to moderate the feel of the footwear securing system and/or to provide heel and/or ankle support. The footwear upper may include a strap system that applies force to the first major surface of the fluid supply chamber(s) and moves fluid from the fluid supply chamber(s) (e.g., located at an instep area of the footwear upper) to the one or more heel and/or ankle support chambers. Such bladders, footwear uppers, and articles of footwear may operate to move fluid in a pump-free manner (i.e., no pump is used with and/or included in such products).

While aspects of this technology are described in terms of bladders, footwear uppers including such bladders, and articles of footwear including such bladders, additional aspects of this technology relate to methods of making such bladders, footwear uppers, and/or articles of footwear and/or methods of using such bladders, footwear uppers, and/or articles of footwear, e.g., to provide additional support for a wearer's heel and/or ankle.

BRIEF DESCRIPTION OF THE DRAWINGS

The foregoing Summary, as well as the following Detailed Description, will be better understood when considered in conjunction with the accompanying drawings in which like reference numerals refer to the same or similar elements in all of the various views in which that reference number appears.

FIGS. 2A-2D illustrate components of articles of footwear in accordance with some aspects of this technology and features of their engagement with a wearer's foot;

FIGS. 4 and 5 illustrate other example upper blank and bladder structures in accordance with some aspects of this technology;

DETAILED DESCRIPTION

Figure 1A:
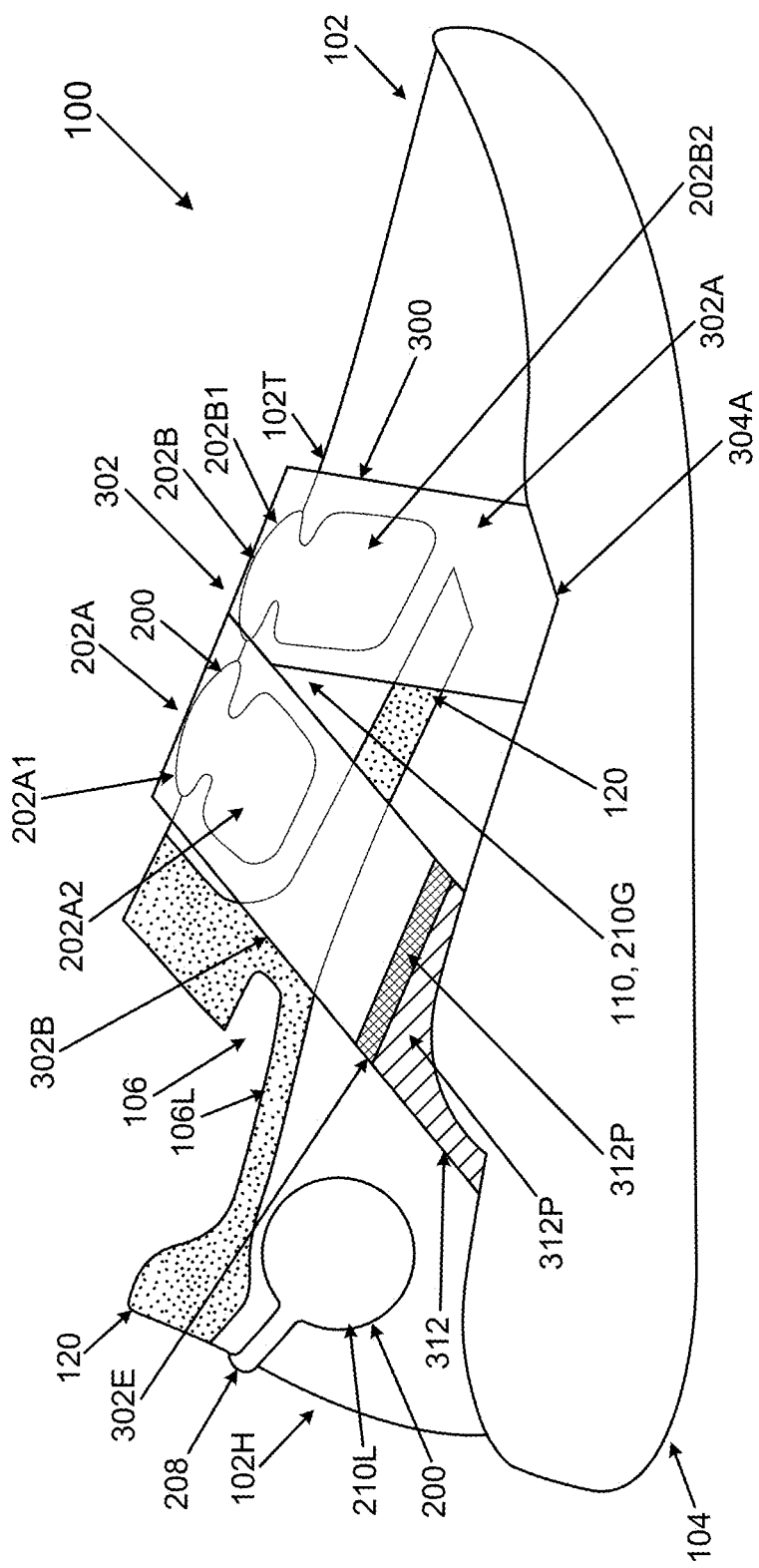
FIGS. 1A and 1B provide side views of an article of footwear in accordance with some aspects of this technology.

In the following description of various examples of bladders, footwear uppers, and/or articles of footwear according to the present technology, reference is made to the accompanying drawings, which form a part hereof, and in which are shown by way of illustration various example structures and environments in which aspects of the technology may be practiced. It is to be understood that other structures and environments may be utilized and that structural and functional modifications may be made to the specifically described structures, functions, and methods without departing from the scope of the present disclosure.

I. General Description of Aspects of this Technology

As noted above, aspects of this technology relate to bladders, footwear uppers including such bladders, and articles of footwear including such bladders, e.g., of the types described and/or claimed below and/or of the types illustrated in the appended drawings. Such bladders, footwear uppers including such bladders, and articles of footwear including such bladders may include any one or more structures, parts, features, properties, and/or combination(s) of structures, parts, features, and/or properties of the examples described and/or claimed below and/or of the examples illustrated in the appended drawings.

This application and/or claims use the adjectives, e.g., "first," "second," "third," and the like, to identify certain components and/or features relating to this technology. These adjectives are used merely for convenience, e.g., to assist in maintaining a distinction between components and/or features of a specific structure. Use of these adjectives should not be construed as requiring a specific order or arrangement of the components and/or features being discussed. Also, use of these specific adjectives in the specification for a specific structure does not require that the same adjective be used in the claims to refer to the same part (e.g., a component or feature referred to as the "third" in the specification may correspond to any numerical adjective used for that component or feature in the claims).

This application describes footwear components (e.g., upper components (including fabric components), bladder components, sole structures, etc.) that are "bonded" together. The term "bonded" (and derivatives thereof) means that the components are joined securely to one another. The term "bonded" encompasses bonds formed using adhesives or cements (including hot melt adhesives) as well as bonds formed in an "adhesive free" manner, i.e., without use of a separate adhesive component. "Adhesive free" bonds include bonds formed by fusing or melting components together (e.g., if the components include compositions that are compatible to mix and join together to form a bond, such as two components including a thermoplastic polyurethane component); bonds formed by welding techniques (e.g., RF welding, ultrasonic welding, high-frequency welding, laser welding, impulse welding, etc.); bonds formed by heat sealing; etc. Some adhesive free bonds may form a seamless joint between the two previously separate components (e.g., the materials mix and join together and then re-harden with no discernible junction). The term "melt bond" and variations thereof, as used herein, mean bonds formed where localized melting of each component occurs (e.g., melting of the thermoplastic polymer present in each component), the melted components combine together, and then the combined components harden to thereby "fuse" and "bond" the two components together. Such melt bonded joints are adhesive free and may be seamless. The term "engaged with" is used herein as a generic term and includes both adhesive based bonds and adhesive free bonds within its scope as well as other potential types of engagement that fix two (or more) components together in a "non-bonded" manner (including through the use of mechanical connectors or fasteners, through the use of sewing or stitching, etc.).

Some more specific aspects or examples of this technology relate to footwear uppers that include:
(a) a footwear upper base formed from one or more component parts (e.g., one or more fabric components and/or other components) and including: (i) an instep region including at least one of a tongue base region or an instep base region and (ii) a heel-containing region; and
(b) a bladder including: (i) a first instep chamber engaged with (e.g., bonded to) the instep region of the footwear upper base, (ii) a first heel and/or ankle support chamber engaged with (e.g., bonded to) the heel-containing region of the footwear upper base, and (iii) a first fluid line connecting the first instep chamber and the first heel and/or ankle support chamber and placing the first instep chamber in fluid communication with the first heel and/or ankle support chamber.

In some examples of these aspects of this technology, a strap system may be provided to secure the upper to a wearer's foot.

Additional aspects or examples of this technology relate to footwear uppers that include:
(a) a footwear upper base formed from one or more component parts (e.g., one or more fabric components and/or other components) and including: (i) an instep region including at least one of a tongue base region or an instep base region and (ii) a heel-containing region;
(b) a bladder including: (i) a first instep chamber engaged with (e.g., bonded to) the instep region of the footwear upper base, (ii) a first heel and/or ankle support chamber engaged with (e.g., bonded to) the heel-containing region of the footwear upper base, and (iii) a first fluid line connecting the first instep chamber and the first heel and/or ankle support chamber and placing the first instep chamber in fluid communication with the first heel and/or ankle support chamber; and
(c) a strap system including a first strap portion structured and configured to extend across a first major surface of the first instep chamber.

When tightened, strap systems provided in footwear uppers according to the above aspects or examples of this technology may apply a force to the first instep chamber to move fluid from the first instep chamber through the first fluid line to the first heel and/or ankle support chamber. This movement of fluid increases the fluid pressure and/or volume in the heel and/or ankle support chamber. In this manner, the increased fluid pressure and/or volume applies additional support to the wearer's heel and/or ankle and/or may improve comfort and/or fit (e.g., by eliminating at least some excess open space within the footwear upper). The fluid may move within the bladder without the use of and/or need for a pump (manually operated or powered) to move the fluid.

In some footwear uppers in accordance with the above aspects or examples of this technology, the bladder will be directly engaged with a fabric component (e.g., a knit fabric component) that forms at least one of the component parts of the footwear upper base. This direct engagement may include bonding the fabric component and the bladder in an adhesive-free manner, e.g., by joining a thermoplastic material included as part of the fabric component(s) with a thermoplastic material included as part of the bladder using heat and pressure (e.g., to melt bond the thermoplastic materials together).

Additional aspects and examples of this technology include bladders, e.g., for inclusion in footwear uppers, that include: (a) a first thermoplastic sheet; (b) a second thermoplastic sheet facing the first thermoplastic sheet; and (c) a continuous outer perimeter seam sealing the first thermoplastic sheet to the second thermoplastic sheet. The first and second thermoplastic sheets may be provided as separate components or as portions of a single thermoplastic component (e.g., as two layers formed from a folded sheet). The continuous outer perimeter seam defines a sealed interior volume between the first thermoplastic sheet and the second thermoplastic sheet. In some examples of this technology, this continuous outer perimeter seam extends continuously to form the sealed interior volume to include a bladder chamber that underlies at least a portion of a footwear securing system (e.g., straps, laces, etc.), e.g., to moderate force applied to a wearer's instep by the securing system. Additionally or alternatively, in some examples of this technology, this continuous outer perimeter seam extends continuously to form the sealed interior volume to include: (i) a fluid supply chamber having a first major surface formed by the first thermoplastic sheet, (ii) a first heel and/or ankle support chamber, (iii) a first fluid line connecting the fluid supply chamber and the first heel and/or ankle support chamber through the sealed interior volume, (iv) a second heel and/or ankle support chamber, and (v) a second fluid line connecting the first heel and/or ankle support chamber and the second heel and/or ankle support chamber through the sealed interior volume. Such bladders may be used in footwear uppers, e.g., of the various aspects and examples described above.

Still additional aspects and examples of this technology include bladders, e.g., for inclusion in footwear uppers, that include: (a) a first thermoplastic sheet; (b) a second thermoplastic sheet facing the first thermoplastic sheet; and (c) a continuous outer perimeter seam sealing the first thermoplastic sheet to the second thermoplastic sheet. The first and second thermoplastic sheets may be provided as separate components or as portions of a single thermoplastic component (e.g., as two layers formed from a folded sheet). The continuous outer perimeter seam defines a sealed interior volume between the first thermoplastic sheet and the second thermoplastic sheet. In some examples of this technology, this continuous outer perimeter seam extends continuously to form the sealed interior volume to include a bladder chamber that underlies at least a portion of a footwear securing system (e.g., straps, laces, etc.), e.g., to moderate force applied to a wearer's instep by the securing system. Additionally or alternatively, in some examples of this technology, this continuous outer perimeter seam extends continuously to form the sealed interior volume to include: (i) a fluid supply chamber having a first major surface formed by the first thermoplastic sheet, (ii) a first heel and/or ankle support chamber, (iii) a first fluid line connecting the fluid supply chamber and the first heel and/or ankle support chamber through the sealed interior volume, (iv) a second heel and/or ankle support chamber, and (v) a second fluid line connecting the fluid supply chamber and the second heel and/or ankle support chamber through the sealed interior volume. The first and second fluid lines may extend along opposite sides of the footwear upper. Such bladders may be used in footwear uppers, e.g., of the various aspects and examples described above.

Further aspects of this technology relate to articles of footwear including the bladders and/or footwear uppers of the various types described above. Still additional aspects of this technology relate to methods of making the bladders, footwear uppers, and/or articles of footwear described above.

Given the general description of features, examples, aspects, structures, and methods according to examples of the technology provided above, a more detailed description of specific example footwear uppers, bladders, articles of footwear, and methods in accordance with this technology follows.

Figure 1B:
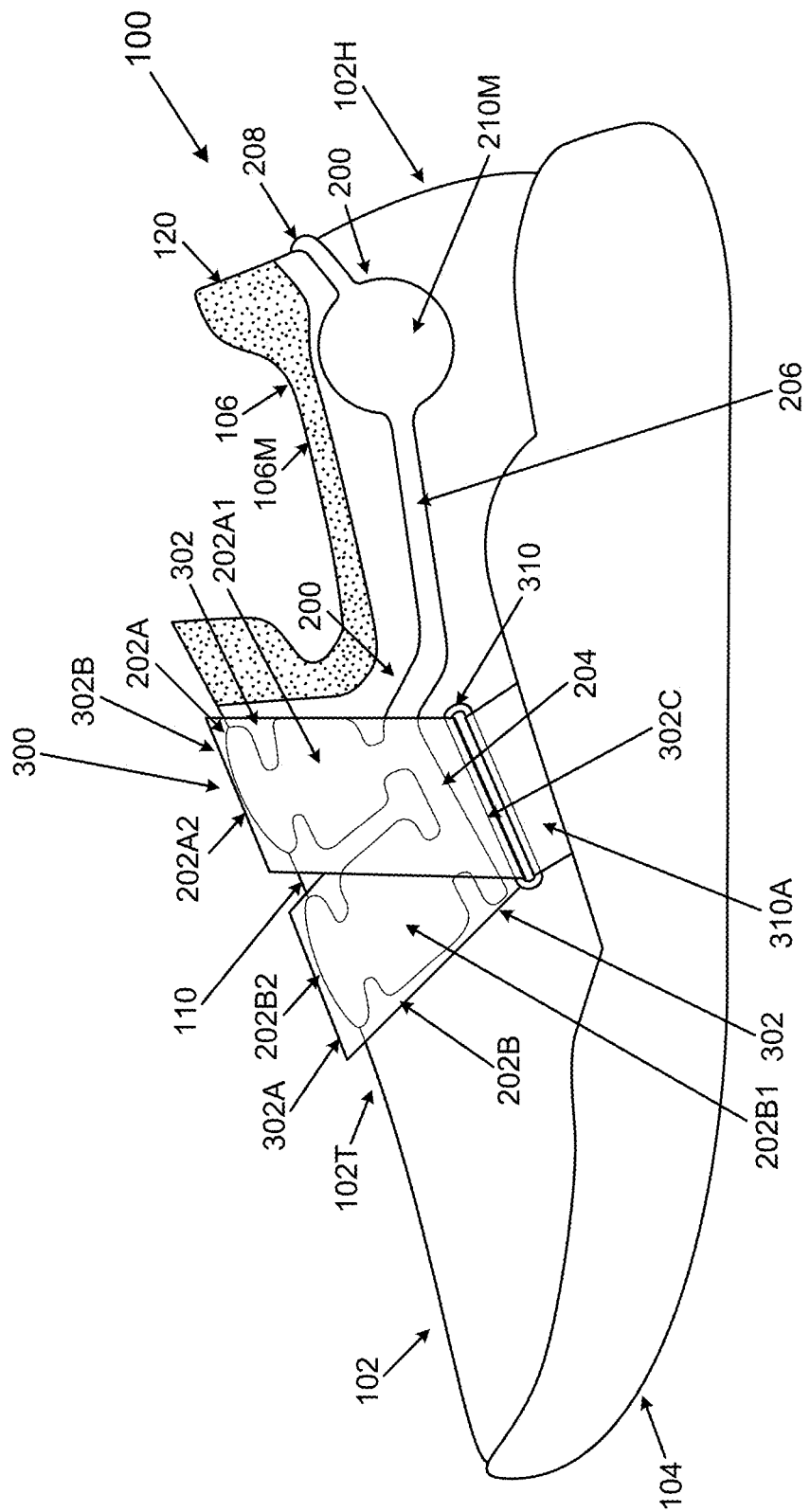

II. Detailed Description of Example Bladders, Footwear Uppers, Articles of Footwear, Heel and/or Ankle Support Systems, and Other Components/Features According to this Technology FIGS. 1A and 1B show lateral and medial side views, respectively, of an article of footwear 100 in accordance with some aspects of this technology. The article of footwear 100 includes a footwear upper base 102 formed from one or more component parts. The term "footwear upper base" as used herein means a footwear upper, optionally made from one or more conventional parts and/or made in conventional manners. Other components, such as a bladder system and a footwear securing system (e.g., a strap system) may be engaged with (e.g., bonded to) or otherwise associated with the footwear upper base 102. While other options are possible, the illustrated footwear upper base 102 is formed from multiple fabric components (e.g., one or more knit components) that are engaged together by sewn seams, by melt bonds, by welding techniques, by mechanical connectors, etc.

In this illustrated example, the footwear upper base 102 includes: (i) an instep region 102T including at least one of a tongue base region or an instep base region and (ii) a heel-containing region 102H. The footwear upper base 102 further defines a foot-receiving opening 106. A sole structure 104, including one or more component parts, engages the footwear upper base 102. The sole structure 104 may have any desired construction and/or component parts and/or may be engaged with the footwear upper base 102 in any desired manner, including conventional constructions and/or component parts and/or conventional engagement methods as are known and used in the footwear arts.

This example article of footwear 100 includes a bladder 200 (e.g., a gas or other fluid-filled bladder) engaged with (e.g., bonded to, sewn to, etc.) the footwear upper base 102. The bladder 200 includes at least one instep chamber engaged with (e.g., bonded to) the instep region 102T of the footwear upper base 102. This specific example bladder 200 includes a first instep chamber 202A having multiple "bulbs" (or lobes) 202A1, 202A2 in fluid communication with one another and a second instep chamber 202B also having multiple "bulbs" 202B1, 202B2 (or lobes) in fluid communication with one another. Note also FIGS. 2A and 2C. One end of the first instep chamber 202A and one end of the second instep chamber 202B in this illustrated example are placed in fluid communication with one another via a connecting fluid line 204. An exposed portion 110 of one or more footwear upper base 102 components is exposed at an exterior of the article of footwear 100 (e.g., potentially underlying one or more straps to be discussed in more detail below) at locations between the first instep chamber 202A and the second instep chamber 202B (e.g., at a gap 210G in the bladder 200). Note also FIGS. 2A and 2C.

This example bladder 200 further includes at least one heel and/or ankle support chamber engaged with (e.g., bonded to, sewn to, etc.) the heel-containing region 102H of the footwear upper base 102. This specific example bladder 200 includes a first heel and/or ankle support chamber 210M (e.g., on a medial side of the footwear upper base 102) and a second heel and/or ankle support chamber 210L (e.g., on a lateral side of the footwear upper base 102). In this example, a first fluid line 206 (which is an extension of the connecting fluid line 204) connects the first instep chamber 202A and the second instep chamber 202B with the first heel and/or ankle support chamber 210M. In this manner, both the first instep chamber 202A and the second instep chamber 202B are in fluid communication with the first heel and/or ankle support chamber 210M via first fluid line 206. Also, a second fluid line 208 extends between and places the first heel and/or ankle support chamber 210M in fluid communication with the second heel and/or ankle support chamber 210L. In the example bladder 200 shown in FIGS. 1A and 1B, the second heel and/or ankle support chamber 210L receives fluid only through the second fluid line 208 that connects with the first heel and/or ankle support chamber 210M. The second fluid line 208 wraps around a rear heel and/or ankle portion of the footwear upper base 102, extending from the medial side of the footwear upper base 102 to its lateral side. Thus, in the illustrated bladder 200, the entire interior chamber of the bladder 200 (the first instep chamber 202A, the second instep chamber 202B, the first heel and/or ankle support chamber 210M, and the second heel and/or ankle support chamber 210L) are in open fluid communication with one another (via connecting fluid line 204, first fluid line 206, and second fluid line 208).

The bladder 200 may be engaged with the footwear upper base 102 component(s) in any desired manner. As some more specific examples, the bladder 200 may be engaged with one or more footwear upper base 102 components at least in part by adhesives. Additionally or alternatively, the bladder 200 may be engaged with one or more footwear upper base 102 components at least in part by one or more mechanical connectors (e.g., rivets, crimped metal ring connectors, sewn seams, etc.). Still additionally or alternatively, bladder 200 may be engaged with one or more footwear upper base 102 components at least in part by a melt bonded or welded connection (e.g., bonding a thermoplastic material of the bladder 200 with a thermoplastic material present in a footwear upper base 102 component part (e.g., a knitted part including a thermoplastic component in one or more yarns)), by heat and pressure, by localized melting, by welding techniques (e.g., RF welding, ultrasonic welding, etc.), etc. In some examples of this technology, the bladder 200 will be engaged with one or more footwear upper base 102 components (including a knit footwear upper base 102 component) at least in part in an adhesive-free manner. Concurrently filed U.S. Patent Appln. No. 63/277,916, filed Nov. 10, 2021 and U.S. Patent Appln. No. 63/277,932, filed Nov. 10, 2021—each entitled "Footwear Uppers Including Bladders and Articles of Footwear Including Bladders in the Upper" and each of which is entirely incorporated herein by reference—describe various ways that a bladder may be bonded to a footwear upper component that may be used in accordance with this technology.

FIG. 1B shows the first fluid line 206 extending along and proximate to a medial side edge 106M of the foot-receiving opening 106 defined by the footwear upper base 102 (i.e., the top edge of the foot-receiving opening 106 on the medial side of the article of footwear 100). Alternatively, if desired, the bladder 200 structure can be flip-flopped on the footwear upper base 102 such that: (a) the first heel and/or ankle support chamber is located on the lateral side of the footwear upper base 102, (b) the second heel and/or ankle support chamber is located on the medial side of the footwear upper base 102, and (c) the first fluid line 206 extends along and proximate to a lateral side edge 106L of the foot-receiving opening 106 (i.e., the top edge of the foot-receiving opening 106 on the lateral side of the article of footwear 100), e.g., at a similar position on the lateral side as shown on the medial side in FIG. 1B. Thus, in the figures, FIG. 1A could constitute a medial side view and FIG. 1B could constitute a lateral side view. The term "proximate to" as used herein in this context with respect to the location of the first fluid line 206 with respect to the top side edge of the foot-receiving opening 106 means that at least a 20 mm length of the first fluid line 206 is located within 30 mm of the respective top side edge (106M, 106L) of the foot-receiving opening 106. Also, in at least some examples of this technology, the first fluid line 206, the second fluid line 208, and/or the connecting fluid line 204 will have a transverse cross sectional area of less than 160 mm², and in some examples, less than 100 mm², less than 80 mm², less than 65 mm², or even less than 50 mm² over at least a 20 mm length (and in some examples, over at least a 30 mm length, at least a 40 mm length, or even at least a 50 mm length).

FIGS. 1A and 1B further illustrate that this example article of footwear 100 includes a footwear securing system in the form of a strap system 300 having one or more straps. In the specifically illustrated example, the strap system 300 includes a single strap 302 having a first strap portion 302A that extends over a first major surface of the second instep chamber 202B and a second strap portion 302B that extends over a first major surface of the first instep chamber 202A. The strap system 300 includes a strap 302 having its first end 304A fixedly secured (e.g., by stitching, by adhesive, by mechanical connector, etc.) to at least one of the footwear upper base 102 and/or the sole structure 104 (optionally sandwiched between the footwear upper base 102 and the sole structure 104) at one side (e.g., the lateral side) of the article of footwear 100 structure. From its first end 304A, the strap 302 includes the first strap portion 302A that extends over a first major surface of the second instep chamber 202B (e.g., over both of its "bulbs" 202B2 and 202B1 in this example). At the other side (e.g., the medial side) of the footwear upper base 102 and the article of footwear 100, the strap 302 includes an intermediate strap portion 302C that engages a retaining device 310 (e.g., a strap "direction change" device). In this illustrated example, the retaining device 310 includes a ring through which the intermediate strap portion 302C extends, and this ring is attached to the footwear upper base 102 and/or sole structure by a strap 310A. Strap 310A optionally is sandwiched between and/or engaged with at least one of the footwear upper base 102 and the sole structure 104, e.g., by stitching, by adhesive, by mechanical connector, etc. At the retaining device 310, the strap 302 changes direction such that the second strap portion 302B extends over a first major surface of the first instep chamber 202A (e.g., over both of its "bulbs" 202A2 and 202A1 in this example). A securing system 312 secures the second strap portion 302B, e.g., to one of the footwear upper base 102, to the sole structure 104, and/or to the second strap portion 302B. While the illustrated example shows each of the free end 302E of the second strap portion 302B and the footwear upper base 102 including portions 312P of a hook-and-loop type fastener, other securing systems may be used without departing from this technology, including, for example, a buckle system, a button system, a snap fastener system, a zipper system, a mechanical fastener extending between openings in the two strap portions 302A, 302B, another retaining device 310, etc.

In use, a wearer dons the article of footwear 100 by placing his/her foot inside the foot-receiving opening 106. The strap system 300 is tightened around the foot by pulling the second strap portion 302B tightly against the retaining device 310 and securing its free end 302E using the securing system 312. Force applied to the instep chamber(s) (e.g., first instep chamber 202A and/or the second instep chamber 202B) by the strap system 300 moves fluid contained within the bladder 200 from the instep chamber(s) (e.g., 202A, 202B) to the heel and/or ankle support chamber(s) (e.g., first heel and/or ankle support chamber 210M and/or second heel and/or ankle support chamber 210L) to increase fluid pressure and/or fluid volume in the heel and/or ankle support chamber(s). The increased fluid pressure and/or fluid volume in the heel and/or ankle support chamber(s) (e.g., first heel and/or ankle support chamber 210M and/or second heel and/or ankle support chamber 210L) provides additional support for the wearer's heel and/or ankle. Additionally or alternatively, in at least some examples of this technology, increased fluid pressure and/or fluid volume the heel and/or ankle support chamber(s) may improve comfort and/or fit (e.g., by eliminating at least some excess open space within the footwear upper).

Figure 2C:
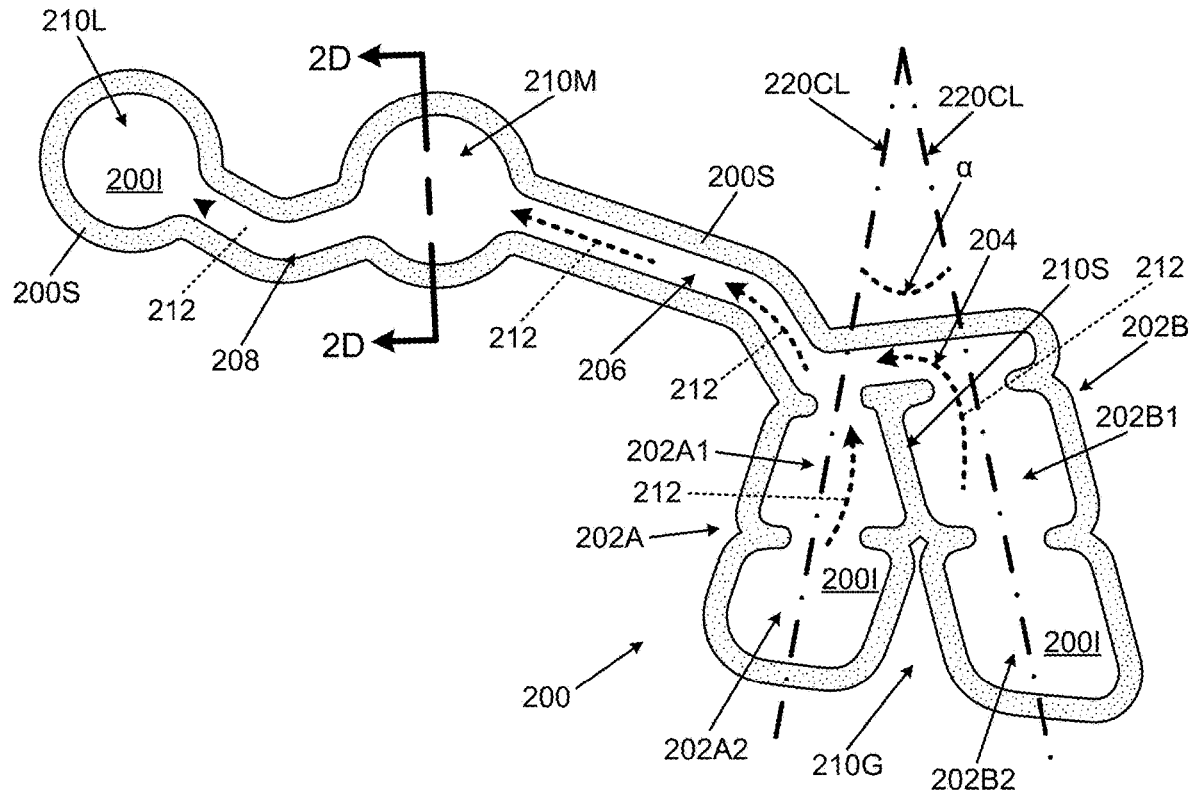

FIGS. 2A-2D illustrate various parts and/or features of a footwear upper base 102 in accordance with some aspects of this technology. FIG. 2A shows the footwear upper base 102 as an upper blank 130 (i.e., before it is attached to a footwear sole structure 104) with various other components attached to it. FIG. 2A illustrates how the first strap portion 302A extends over major surfaces of the second instep chamber 202B (e.g., over both of its "bulbs" 202B2 and 202B1) and how the intermediate strap portion 302C extends through retaining device 310. It also is readily evident from FIG. 2A how the intermediate strap portion 302C turns against retaining device 310 so that the second strap portion 302B can extend over the first major surface of the first instep chamber 202A (e.g., over both of its "bulbs" 202A2 and 202A1). From there, portion 312P of the securing system 312 provided on the free end 302E of the second strap portion 302B can engage the portion 312P of the securing system 312 provided on the lateral side of the footwear upper base 102.

Footwear upper base 102 may be made from one or more component parts, e.g., including fabric parts, such as knitted fabric components. When the footwear upper base 102 component(s) include a thermoplastic material (e.g., a knitted fabric component with at least one thermoplastic yarn), this may enable engagement of the footwear upper base 102 with the bladder 200 in an adhesive free manner, e.g., as described above. The footwear upper base 102 shown in FIGS. 1A-2A further includes a stretchable fabric component 120 (e.g., an elastic or elastomeric component, such as a stretchable chenille fabric) around the foot receiving opening 106 and along a lateral side of the instep region 102T to provide comfort, to enable easy donning and doffing, and to help hold the overall footwear upper to a wearer's foot.

FIG. 2B illustrates areas 10M, 10L of a human foot 10 that may receive additional support from the first and second heel and/or ankle support chamber(s) 210M, 210L in some examples of this technology (the support "pod" locations with respect to a wearer's foot). As described above, force applied to the instep chamber(s) (e.g., first instep chamber 202A and/or the second instep chamber 202B) by the strap system 300 compresses the instep chamber(s) 202A/202B and moves fluid contained within the bladder 200 from the instep chamber(s) 202A/202B toward the heel and/or ankle support chamber(s) (e.g., first heel and/or ankle support chamber 210M and/or second heel and/or ankle support chamber 210L) to increase fluid pressure and/or fluid volume in the heel and/or ankle support chamber(s) 210M/210L. The increased fluid pressure and/or fluid volume in the heel and/or ankle support chamber(s) 210M/210L provides additional support for the medial side 10M and lateral side 10L of a wearer's heel and/or ankle, in the areas shown in FIG. 2B and/or may improve comfort and/or fit.

Figure 2D:
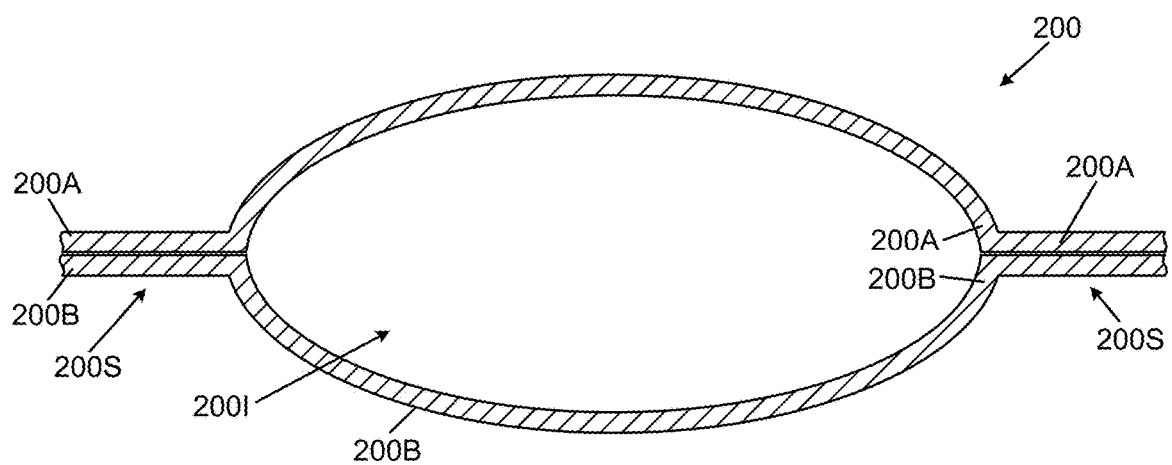

FIGS. 2C and 2D illustrate the bladder 200 separated from the footwear upper base 102. FIG. 2D is a cross-sectional view, e.g., taken along line 2D-2D in FIG. 2C. As shown in these figures, the bladder 200 is formed with a single, continuous outer perimeter scam 200S that extends completely around the exterior perimeter of the bladder 200. The scam 200S may be formed by heat and pressure and/or welding techniques (e.g., RF welding, ultrasonic welding, etc.) to join two thermoplastic sheets 200A, 200B of material together. An interior chamber 200I is provided in the space defined between the two thermoplastic sheets and the seam 200S. As shown in FIG. 2C, the space defined between the two thermoplastic sheets and the seam 200S defines a single, interconnected, fluid chamber 200I, which in this example has all interior chamber portions in fluid communication with one another. In other words, fluid can freely move within the bladder 200's sealed interior chamber 200I, e.g., depending on external forces applied to the bladder 200. The outer perimeter seam 200S may be used for engaging the bladder 200 with a fabric (or other) component of the footwear upper base 102, e.g., by stitching through the outer perimeter seam 200S into the fabric (or other) component, by an adhesive connection, by a melt bond or other adhesive-free bonded connection, etc.

As further shown in FIG. 2C, the outer perimeter seam 200S includes an extended single continuous seam portion 210S that separates the first portion 202A1 of the first instep chamber 202A from the first portion 202B1 of the second instep chamber 202B. Further, the instep region of the bladder 200 is shaped such that a gap 210G exists between the second portion 202A2 of the first instep chamber 202A and the second portion 202B2 of the second instep chamber 202B. The gap 210G corresponds to a space between the outer edge of two portions of the outer perimeter seam 200S. As described above, one or more footwear upper base 102 components may be exposed in the gap 210G (note the discussion of exposed portion 110 above). See also FIGS. 1A and 2A.

In the illustrated example of FIG. 2C, the first instep chamber 202A and the second instep chamber 202B are oriented and configured so that their longitudinal center lines 220CL meet at an acute angle α. The angle α in this example is selected to generally correspond to the angle created by securing the strap system 300 around the wearer's foot so that the strap 302 will apply compressing force to relatively large areas of the first instep chamber 202A and the second instep chamber 202B. Force applied in the direction into the page of FIG. 2C will move fluid from the second instep chamber 202B through connecting fluid line 204 and from the first instep chamber 202A in the direction of arrows 212 toward and to the first heel and/or ankle support chamber 210M and the second heel and/or ankle support chamber 210L. The angle α may be within a range of 10 degrees to 65 degrees, and in some examples, from 12 degrees to 60 degrees or from 15 degrees to 55 degrees.

Figure 3B:
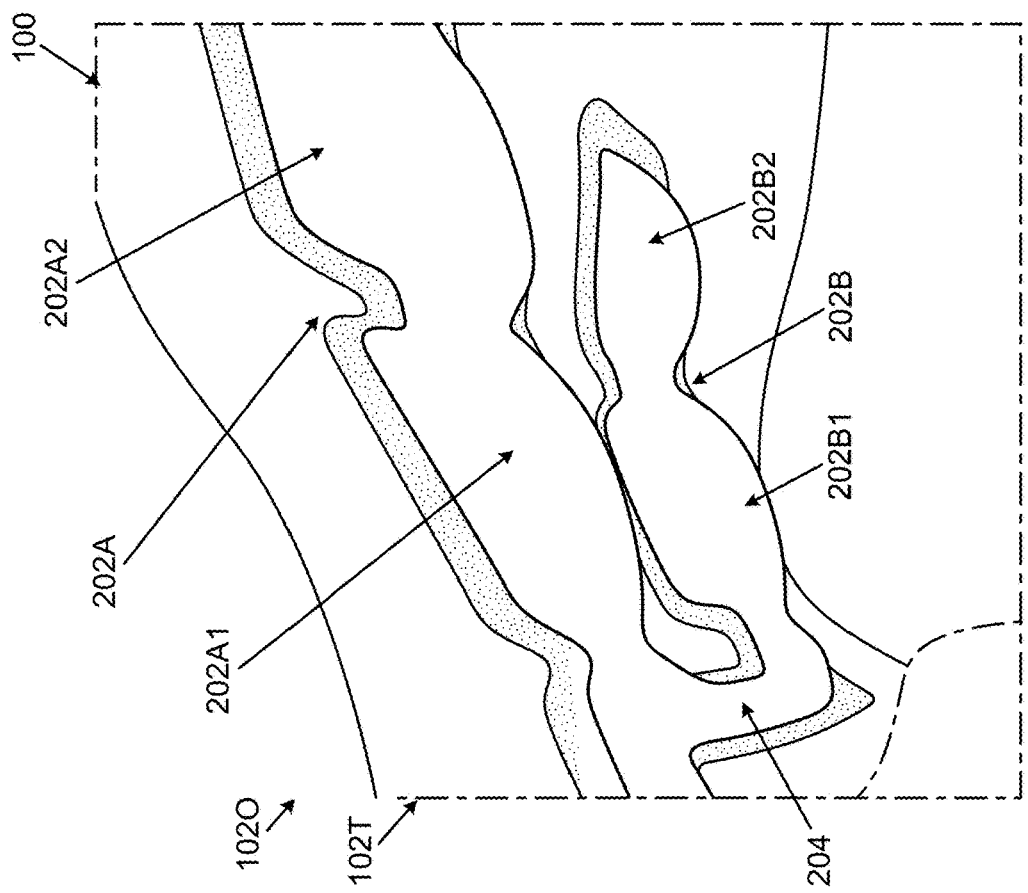
FIGS. 3A and 3B provide interior views of articles of footwear in accordance with some aspects of this technology.
Figure 3A:
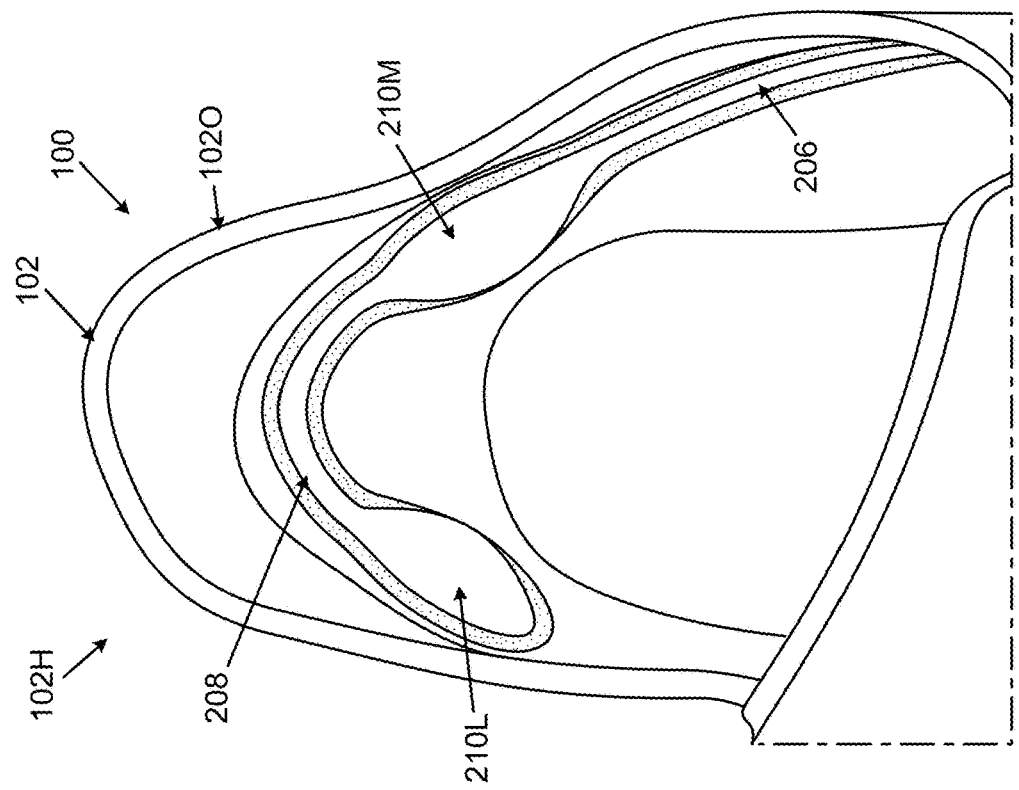

FIGS. 1A, 1B, and 2A illustrate an example article of footwear 100 in which the bladder 200 is provided at the exterior surface of the footwear upper base 102 and article of footwear 100. Other arrangements are possible. For example, in some examples of this technology, at least a majority of a surface area of the bladder 200 (and in some examples, at least 60%, at least 75%, at least 85%, at least 95%, or even 100% of the surface area of the bladder 200) may be located inside an outermost layer of the footwear upper base 102. FIG. 3A shows a heel-containing region 102H of an article of footwear 100 in which at least the first heel and/or ankle support chamber 210M, the second heel and/or ankle support chamber 210L, the first fluid line 206, and the second fluid line 208 are located inside the outermost layer 102O of the footwear upper base 102. Similarly, FIG. 3B shows an instep region 102T of an article of footwear 100 in which at least the first instep chamber 202A and the second instep chamber 202B (including the chamber bulbs 202A1, 202A2, 202B1, 202B2, and the connecting fluid line 204) are located inside the outermost layer 102O of the footwear upper base 102 (e.g., engaged with an interior side of the footwear tongue or other instep-covering component). In the examples of FIGS. 3A and 3B, the illustrated portions of bladder 200 are located inside an interior-most layer or component of the footwear upper base 102. Alternatively, if desired, at least a portion of the bladder 200 could be located between layers of the footwear upper base 102 (e.g., between an innermost and an outermost layer of a footwear upper).

Figure 4:
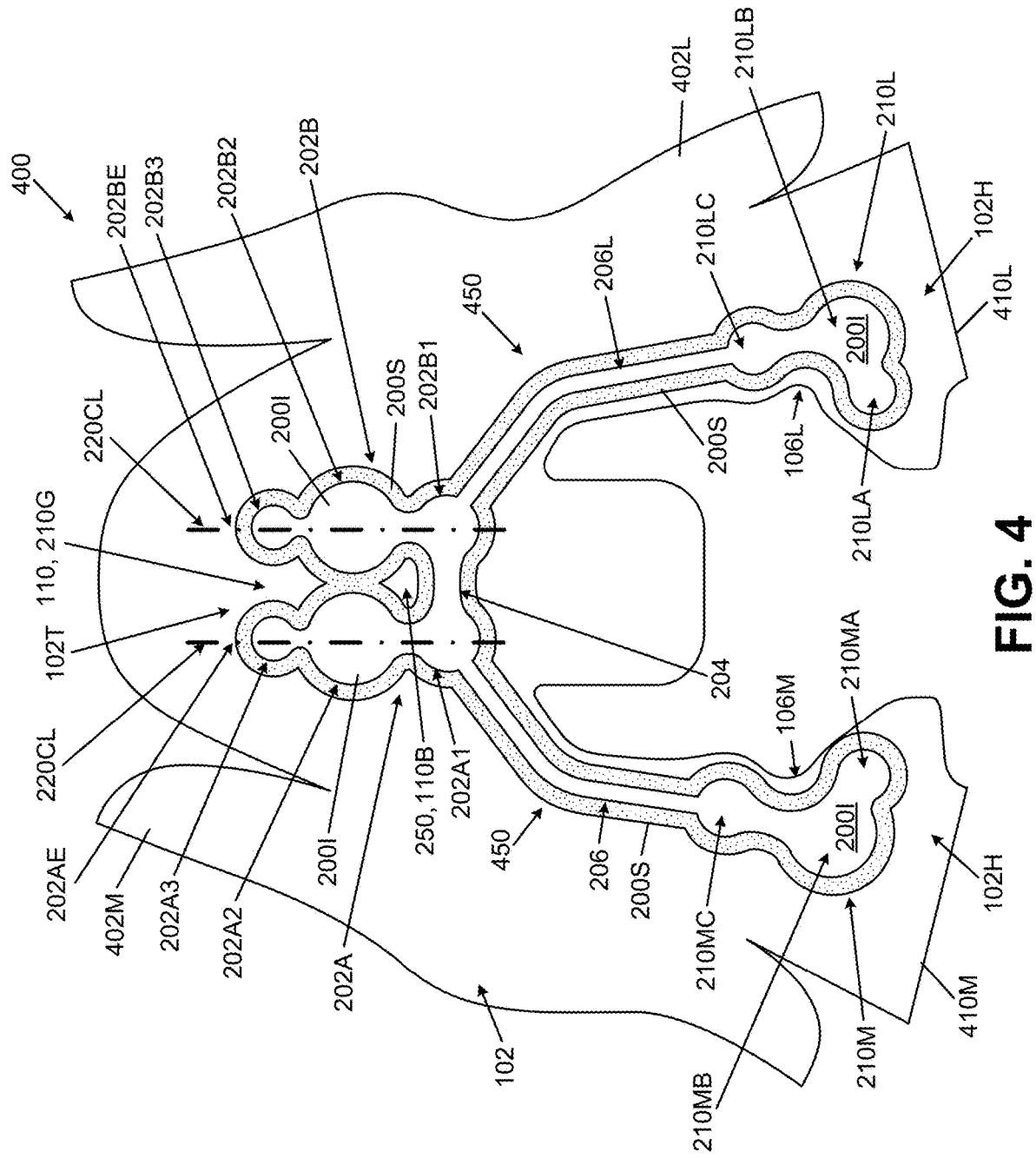

FIG. 4 illustrates another example upper blank 400 with attached bladder 450 in accordance with some aspects of this technology. Where the same reference numbers are used in FIG. 4 as are used in FIGS. 1A-3B, those reference numbers refer to the same or similar parts (with any of the options, alternatives, etc. as described for the parts above) and a more detailed description may be omitted. The description of FIG. 4 below will primarily focus on at least some areas of distinction between the structure of FIG. 4 and the other structures described above.

First, as readily evident from a comparison of FIG. 2A and FIG. 4, the upper blank 400 of FIG. 4 includes a bottom medial portion 402M and a bottom lateral portion 402L that will fold around and form at least a portion of a bottom surface of the upper when the final article of footwear is constructed. The upper blank 400 of FIG. 4 also is more symmetric, especially in the heel-containing region 102H, as compared to the upper blank 130 of FIG. 2A. For example, the medial and lateral sides of the heel-containing region 102H of the upper blank 400 of FIG. 4 will meet at a rear heel seam (e.g., joining edges 410M and 410L), whereas the upper blank 130 of FIG. 2A has one elongated side heel-containing region 102H (extending from the medial side) that wraps around the rear heel area to be joined to the other side (the lateral side) along the side surface of the upper.

The more symmetric upper blank 400 construction of FIG. 4 accommodates a more symmetric bladder 450 structure as compared to the bladder 200 structure of FIGS. 1A to 3B. The bladder 450 of FIG. 4 includes a separate lateral fluid line 206L that connects the bladder chamber(s) 202A, 202B in the instep region 102T with the lateral (or second) heel and/or ankle support chamber 210L. Thus, in the example of FIG. 4, the medial (or first) heel and/or ankle support chamber 210M is not directly connected to the lateral (or second) heel and/or ankle support chamber 210L by a fluid line (second fluid line 208 in the example of FIGS. 1A to 3A is not present in the example of FIG. 4). In the illustrated example, lateral fluid line 206L connects the second instep chamber 202B with the lateral (or second) heel and/or ankle support chamber 210L. Lateral fluid line 206L extends along and proximate to the lateral side edge 106L of the foot-receiving opening 106 defined by the footwear upper base 102 (i.e., the top edge of the foot-receiving opening 106 on the lateral side of the upper blank 400). The term "proximate to" as used herein in this context has the same meaning and refers to the same ranges described above for fluid line 206. Also, in at least some examples of this technology, the lateral fluid line 206L will have a transverse cross sectional area of less than 160 mm$^2$, and in some examples, less than 100 mm$^2$, less than 80 mm$^2$, less than 65 mm$^2$, or even less than 50 mm$^2$ over at least a 20 mm length (and in some examples, over at least a 30 mm length, at least a 40 mm length, or even at least a 50 mm length). While other arrangements are possible, in this illustrated bladder 450, the fluid supply chamber (202A, 202B) and the first heel and/or ankle support chamber 210M are in fluid communication only via the first (medial) fluid line 206, and the fluid supply chamber (202A, 202B) and the second heel and/or ankle support chamber 210L are in fluid communication only via the second (lateral) fluid line 206L.

The example bladder 450 structure of FIG. 4 further includes a medial (or first) heel and/or ankle support chamber 210M and a lateral (or second) heel and/or ankle support chamber 210L that have multi-bulbed (or multi-lobed) constructions in which the bulbs (or lobes) on an individual side are in fluid communication with one another. While other shapes and arrangements are possible, in the example of FIG. 4, each of the medial (or first) heel and/or ankle support chamber 210M and the lateral (or second) heel and/or ankle support chamber 210L has three interconnected bulbs (or lobes)—bulbs 212MA, 212MB, and 212MC on the medial side heel and/or ankle support chamber 210M and bulbs 212LA, 212LB, and 212LC on the lateral side heel and/or ankle support chamber 210L. Such multi-bulbed (or lobed) fits can be advantageous to provide better fit around the bones and other structures in a wearer's heel and/or ankle and/or to produce greater supported surface area around a wearer's heel and/or ankle.

The portions of the bladder 450 located in the instep region 102T of the upper blank 400 of FIG. 4 also have some differences from the bladder 200 shown in FIG. 2A. While the upper blank 400 continues to include a first instep chamber 202A and a second instep chamber 202B, the instep chambers 202A, 202B are located somewhat more forward in instep region 102T as compared to their locations in the bladder 200 of FIG. 2A. Also, the first instep chamber 202A and second instep chamber 202B of FIG. 4 are more symmetrically arranged as compared to the instep chambers shown in FIG. 2A. More specifically, as shown in FIG. 4, the first instep chamber 202A defines a first central axial direction or center line direction 220CL and the second instep chamber 202B defines a second central axial direction or center line direction 220CL. The first central axial direction or center line direction 220CL and the second central axial direction or center line direction 220CL may be parallel or substantially parallel. The term "substantially parallel" as used herein in this context means that the two directions are either parallel or within 5 degrees of parallel (i.e., oriented at an angle from 85 degrees to 95 degrees). Additionally or alternatively, as also shown in FIG. 4, the free ends 202AE and 202BE of one or both of the first instep chamber 202A and/or the second instep chamber 202B, respectively, may form a forwardmost extent of the bladder 450 on the footwear upper base 102.

Further, each of the first instep chamber 202A and the second instep chamber 202B of the example bladder 450 of FIG. 4 includes a multi-bulbed (or multi-lobed) construction. In addition to the two bulbs or lobes 202A1, 202A2 and 202B1, 202B2 shown in the example of FIG. 2A, each of the first instep chamber 202A and the second instep chamber 202B of the example bladder 450 of FIG. 4 includes a third bulb or lobe 202A3, 202B3, respectively. The bulbs or lobes on each individual side are in fluid communication with one another. Additionally, the overall instep chambers 202A, 202B are in fluid communication with one another via connecting fluid line 204. Indeed, the entire sealed interior chamber 200I of the bladder 450 comprises an open interior chamber that is in fluid communication throughout. At least some of the bulbs or lobes 202A1-202A3 and/or 202B1-202B3 may be arranged to interact with one or more straps present in a footwear securing system (e.g., akin to strap system 300 discussed above), e.g., to receive an applied force from the strap system 300 and move fluid toward and to the heel and/or ankle support chambers 210M, 210L. Additionally or alternatively, force for moving fluid toward and to the heel and/or ankle support chambers 210M, 210L may be applied as a wearer bends his/her foot, e.g., when taking a step, when initiating or landing a jump, etc. Bending of a wearer's foot at the instep area can move fluid from the instep based chamber(s) 202A, 202B to the heel and/or ankle support chambers 210M, 210L in all of the example structures described herein (e.g., in the examples of FIGS. 1A-10C). Additionally or alternatively, such bending can move fluid in all of the example structures described herein with or without the presence of a strap system and/or with or without force being applied to the instep chamber by a strap system.

As also shown in FIG. 4, bladder 450 is formed with a single, continuous outer perimeter seam 200S that extends completely around the exterior perimeter of the bladder 450. The seam 200S may be formed by heat and pressure and/or welding techniques (e.g., RF welding, ultrasonic welding, etc.) to join two thermoplastic sheets of material (e.g., layers 200A and 200B in FIG. 2D) together (optionally in an adhesive free manner). The two thermoplastic sheets of material forming the bladder 450 may be formed from two separate thermoplastic sheets or from a single sheet (e.g., that is folded at one edge). The sealed interior chamber 200I is provided in the space defined between the two thermoplastic sheets and the seam 200S. As shown in FIG. 4, the space defined between the two thermoplastic sheets and the seam 200S defines a single, interconnected, fluid chamber 200I, which in this example has all interior chamber portions in fluid communication with one another. In some aspects of this technology, the outer perimeter seam 200S may constitute the sole connection between the two thermoplastic sheets. In other examples, internal weld spots or weld lines may be provided within the interior chamber 200I, e.g., to provide bladder shape control.

As further shown in FIG. 4, the outer perimeter seam 200S defines a gap 210G between the third bulb or lobe 202A3 of the first instep chamber 202A and the third bulb or lobe 202B3 of the second instep chamber 202B. The gap 210G corresponds to a space between the free ends 202AE and 202BE of the instep chambers 202A, 202B, respectively. One or more footwear upper base 102 components may be exposed in the gap 210G, to produce an exposed portion 110 of the footwear upper base 102 as described above. FIG. 4 further shows that the seam 200S in the bladder 450 separates one bulb (e.g., bulb 202A2) of the first instep chamber 202A from one bulb (e.g., bulb 202B2) of the second instep chamber 202B. Between bulbs 202A2 and 202B2, the continuous perimeter seam 200S extends directly and completely from bulb 202A2 to bulb 202B2. Finally, the seam 200S further defines a through hole 250 through the bladder 450 seam 200S, and another exposed portion 110B of the footwear upper base 102 is exposed in this through hole 250. The gap 210G and/or opening 250 may help improve flexibility and/or reduce stiffness of the upper and/or help promote more natural motion.

FIG. 5 illustrates another example upper blank 500 with attached bladder 550 in accordance with some aspects of this technology. Where the same reference numbers are used in FIG. 5 as are used in FIGS. 1A-4, those reference numbers refer to the same or similar parts (with any of the options, alternatives, etc. as described for the parts above) and a more detailed description may be omitted. The description of FIG. 5 below will primarily focus on at least some areas of distinction between the structure of FIG. 5 and the other structures described above.

First, like the upper blank 400 of FIG. 4, the upper blank 500 of FIG. 5 includes a bottom medial portion 402M and a bottom lateral portion 402L that will fold around and form at least a portion of a bottom surface of the upper when the final article of footwear is constructed. Alternatively, if desired, the upper blanks 400, 500 of FIGS. 4 and/or 5, respectively, could omit the bottom medial and lateral portions 402M, 402L (e.g., a separate strobel component could be provided to close the bottom of the upper). As another alternative, if desired, the upper blank 130 shown in FIG. 2A could include material to form at least some portion of the upper bottom. Also, like the upper blank 400 of FIG. 4, the upper blank 500 of FIG. 5 is more symmetric, especially in the heel-containing region 102H, including medial and lateral sides of the heel-containing region 102H that will meet at a rear heel seam along edges 410M and 410L.

The bladder 550 of FIG. 5 includes a separate lateral fluid line 206L that connects the bladder chamber(s) in the instep region 102T with the lateral (or second) heel and/or ankle support chamber 210L. Thus, in the example of FIG. 5, the medial (or first) heel and/or ankle support chamber 210M is not directly connected to the lateral (or second) heel and/or ankle support chamber 210L by a fluid line (second fluid line 208 in the example of FIGS. 1A-2C is not present in the bladder 550 of FIG. 5). In the illustrated example, lateral fluid line 206L connects the first instep chamber 502A with the lateral (or second) heel and/or ankle support chamber 210L. Lateral fluid line 206L extends along and proximate to the lateral side edge 106L of the foot-receiving opening 106 defined by the footwear upper base 102 (i.e., the top edge of the foot-receiving opening 106 on the lateral side of the upper blank 500). Again, the term "proximate to" as used herein in this context has the same meaning as described above with respect to FIG. 4. Also, in at least some examples of this technology, the lateral fluid line 206L will have a transverse cross sectional area of less than 160 mm², and in some examples, less than 100 mm², less than 80 mm², less than 65 mm², or even less than 50 mm² over at least a 20 mm length (and in some examples, over at least a 30 mm length, at least a 40 mm length, or even at least a 50 mm length).

The example bladder 550 structure of FIG. 5 further includes a medial (or first) heel and/or ankle support chamber 210M and a lateral (or second) heel and/or ankle support chamber 210L that each comprises a single enlarged bulb or lobe structure. Alternatively, if desired, either or both of the medial (or first) heel and/or ankle support chamber 210M and/or the lateral (or second) heel and/or ankle support chamber 210L may have a multi-bulbed (or multi-lobed) structure, e.g., of the type shown in FIG. 4.

The portions of the bladder 550 located in the instep region 102T of the upper blank 500 of FIG. 5 have some differences from the bladder 400 shown in FIG. 4. Upper blank 500 includes a first instep chamber 502A having multiple bulbs or lobes located more rearward in the tongue area of the instep region 102T as compared to the instep chamber 202A, 202B locations in the bladder 450 of FIG. 4. More specifically, as shown in FIG. 5, the first instep chamber 502A of this example includes five interconnected bulbs or lobes 502A1-502A5 arranged in series. At least some of these bulbs or lobes 502A1 to 502A5 and/or other part(s) of first instep chamber 502A are located directly on tongue component 520. Bulb (or lobe) 502A1 forms the free end of the first instep chamber 502A in this example, and this bulb 502A1 is located most rearward, toward the lateral side, and/or toward the top edge of the footwear tongue 520. A fluid line 504A connects bulb 502A1 to bulb 502A2, and bulb 502A2 is located more toward a medial side of the upper blank 500 and/or more toward a medial side of the tongue 520 than is bulb 502A1. Fluid line 504B connects bulb 502A2 to bulb 502A3, and bulb 502A3 is located more toward the lateral side of the upper blank 500 and/or more toward a lateral side of the tongue 520 than is bulb 502A2. Fluid line 504C connects bulb 502A3 to bulb 502A4, and bulb 502A4 is located more toward the medial side of the upper blank 500 and/or toward the medial side of the tongue 520 than is bulb 502A3. Bulb 502A4 of this illustrated example is in fluid communication with two fluid lines in addition to fluid line 504C. Fluid line 206 connects to bulb 502A4 and places bulb 502A4 in fluid communication with medial heel and/or ankle support chamber 210M. Fluid line 504D connects to bulb 502A4 and places bulb 502A4 in fluid communication with bulb 502A5. Fluid line 206L connects to bulb 502A5 and places bulb 502A5 in fluid communication with lateral heel and/or ankle support chamber 210L.

The bulbs 502A1-502A5 of first instep chamber 502A in this illustrated example are arranged in a staggered or zigzag manner-having the bulb centers staggered from the lateral side to the medial side of the footwear tongue 520. Lines connecting the centers of bulbs 502A1-502A2-502A3 form an angle within a range of 50 degrees to 110 degrees. Lines connecting the centers of bulbs 502A2-502A3-502A4 form an angle within a range of 50 degrees to 110 degrees. Lines connecting the centers of bulbs 502A3-502A4-502A5 form an angle within a range of 50 degrees to 110 degrees. At least some of the bulbs 502A1-502A5 may be arranged to interact with one or more straps present in a footwear securing system (e.g., akin to strap system 300 discussed above), e.g., to receive an applied force and move fluid toward and to the heel and/or ankle support chambers 210M, 210L. In this illustrated example, bulb 502A3 and/or bulb 502A4 is/are somewhat larger in size and/or volume than one or more of bulb 502A1, bulb 502A2 and/or bulb 502A5, e.g., in some examples, 20% to 80% larger in size and/or volume. Bulb 502A3 may be the same size or different size from bulb 502A4. In the illustrated example, bulb 502A3 is somewhat larger in size and/or volume than bulb 502A4 (e.g., in some examples, 5% to 30% larger in size and/or volume). These larger bulbs 502A3 and 502A4 may be arranged in the upper structure to directly interact with (e.g., underlie) the strap system 300.

Other arrangements of multiple bulbs or lobes in a first instep chamber 502A may be provided in some examples of this technology. For example, more or fewer bulbs or lobes may be present (e.g., from 2 bulbs or lobes to 10 bulbs or lobes). As another example, a single fluid-filled bladder chamber (non-lobed) may be used. Also, while the example of FIG. 5 shows bulb 502A4 as having three fluid line connections (for fluid lines 504C, 504D and 206), any bulb present may include three connections in a similar manner. Additionally or alternatively, if desired, a single bulb may directly connect to both fluid lines 206, 206L that supply fluid to the medial heel and/or ankle support chamber 210M and the lateral heel and/or ankle support chamber 210L, respectively. In the example of FIG. 5, the various bulbs (e.g., 502A1-502A5) and the overall instep chamber 202A are in fluid communication with one another.

As also shown in FIG. 5, bladder 550 is formed with a single, continuous outer perimeter seam 200S that extends completely around the exterior perimeter of the bladder 550. The seam 200S may be formed by heat and pressure and/or welding techniques (e.g., RF welding, ultrasonic welding, etc.) to join two thermoplastic sheets of material (e.g., 200A, 200B) together (see FIG. 2D). The sealed interior chamber 200I is provided in the space defined between the two thermoplastic sheets 200A, 200B and the seam 200S. As shown in FIG. 5, the space defined between the two thermoplastic sheets and the seam 200S defines a single, interconnected, fluid chamber 200I, which in this example has all interior chamber portions in fluid communication with one another.

FIGS. 6A-10C provide various views of other example articles of footwear and/or components thereof in accordance with at least some aspects of this technology. Where the same reference numbers are used in FIGS. 6A-10C as are used in FIGS. 1A-5, those reference numbers refer to the same or similar parts (with any of the options, alternatives, etc. as described for the parts above) and a more detailed description may be omitted.

FIGS. 6A-6D provide a lateral side view, a medial side view, a front, medial perspective view, and a rear view, respectively, of an article of footwear 600 in accordance with some examples of this technology. One feature of the bladder 200 of this example that differs from the bladders 200, 450, 550 of the figures described above relates to the location of the first fluid line 206 that connects the first instep bladder chamber 202A with the heel and/or ankle support chamber. First, the first fluid line 206 extends proximate to a lateral side edge 106L of the foot-receiving opening 106 and connects the first instep bladder chamber 202A directly with the lateral side heel and/or ankle support chamber 210L (rather than to the medial side heel and/or ankle support chamber 210M as shown in the examples of FIGS. 1A-2A and 2C). The term "proximate to" as used herein in this context has the same meaning as described above in conjunction with FIGS. 1A-5. The first fluid line 206 also may have the same cross-sectional size features as described above for fluid lines 206 and 206L. Alternatively, if desired, the bladder 200 structure of FIGS. 6A-6D can be flip-flopped on the footwear upper base 102 such that the first fluid line 206 extends along and proximate to a medial side edge 106M of the foot-receiving opening 106 (i.e., the top edge of the foot-receiving opening 106 on the medial side of the article of footwear 600), e.g., at a similar position on the medial side as shown on the lateral side in FIG. 6A. Thus, in the figures, FIG. 6A could constitute a medial side view and FIG. 6B could constitute a lateral side view.

Figure 6A:
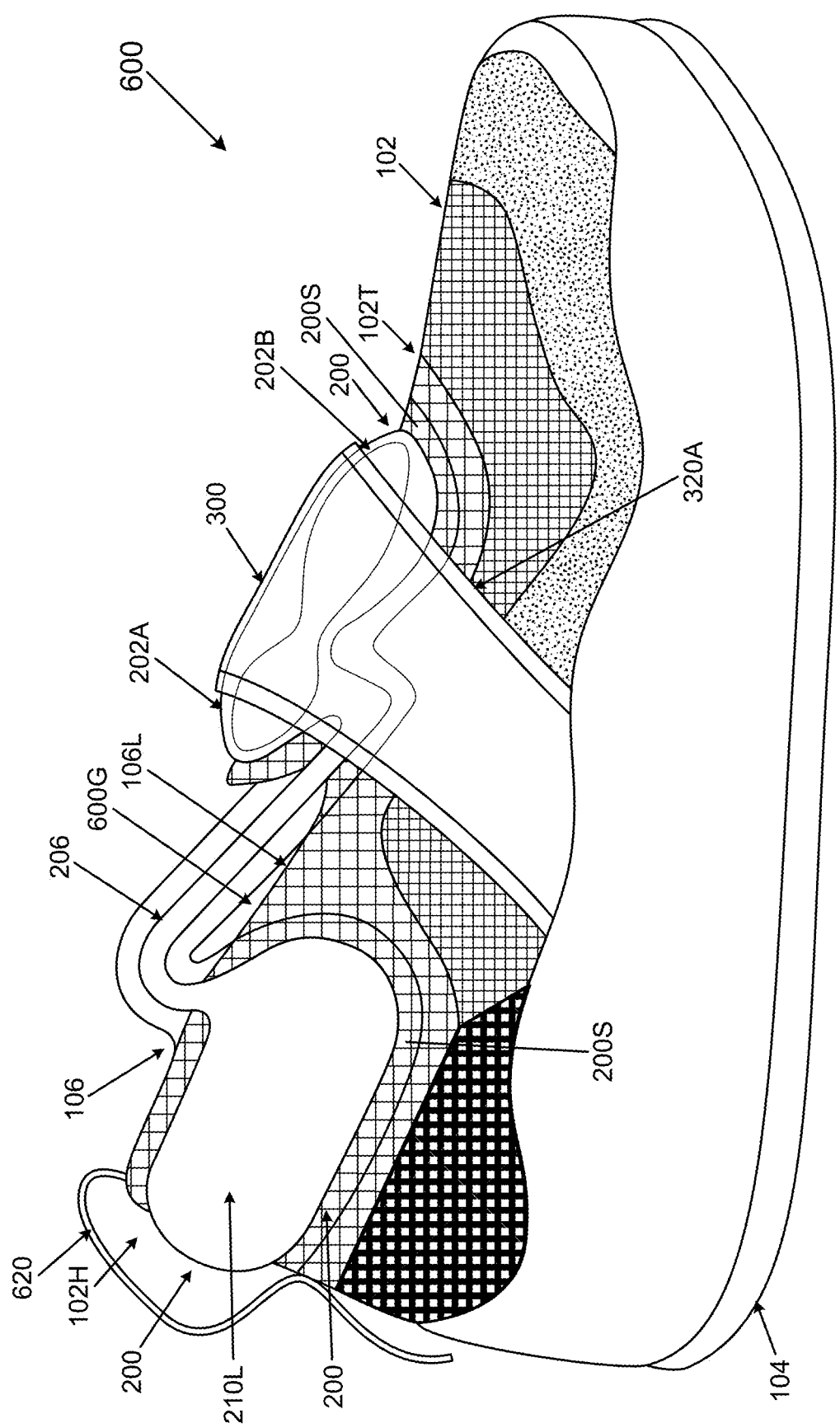
FIGS. 6A-6D provide various views of another article of footwear in accordance with some aspects of this technology.
Figure 6B:
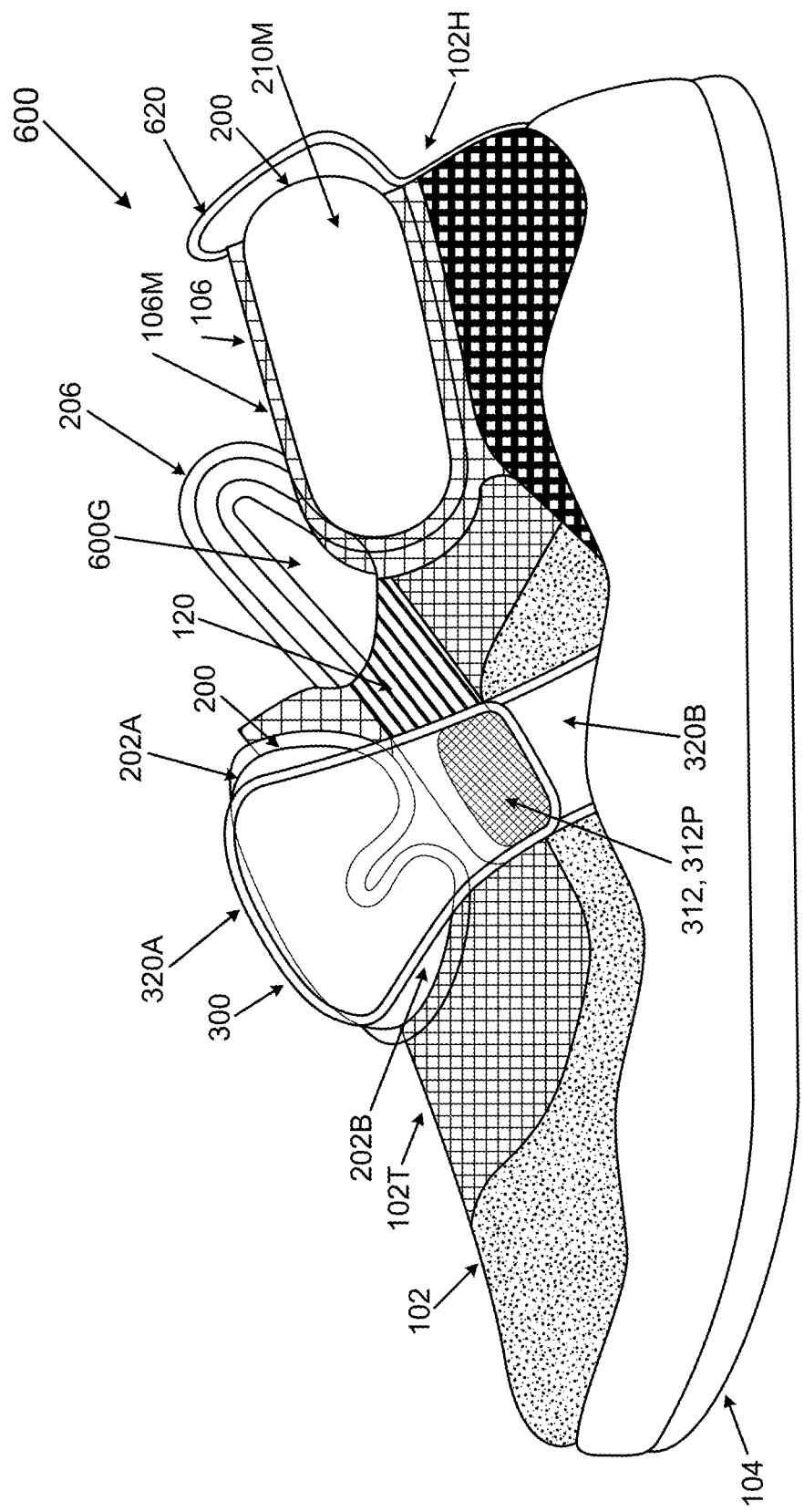

Second, as shown in FIGS. 6A and 6B, at least a portion of the first fluid line 206 of this example is unsupported by any footwear upper base component 102 along a portion of its length (and thus that unsupported portion of the first fluid line 206 may consists of only bladder 200 material and/or may consist only of bladder material with a base backing layer). In this illustrated example, the footwear upper base 102 defines a foot-receiving opening 106 of the article of footwear 600 (and the footwear upper), and the first fluid line 206 extends above the foot-receiving opening 106 over at least a portion of a length of the first fluid line 206 (when the article of footwear 600 is oriented on a horizontal support surface on the ground-facing surface of its sole structure 104). In some examples of this technology, at least a 20 mm continuous length of the fluid line 206 will be located above the foot-receiving opening 106 and/or will be unsupported by the footwear upper base component(s) 102. This unsupported continuous length of the fluid line 206 may extend at least 25 mm, at least 30 mm, at least 40 mm, or even at least 50 mm in some examples. Further, in the example of FIGS. 6A and 6B, a gap 600G (e.g., an enclosed area defining an opening) is defined between: (a) the outer perimeter seam 200S of the bladder 200 along the first fluid line 206 and (b) the top edge 106L of the foot-receiving opening 106.

Figure 6C:
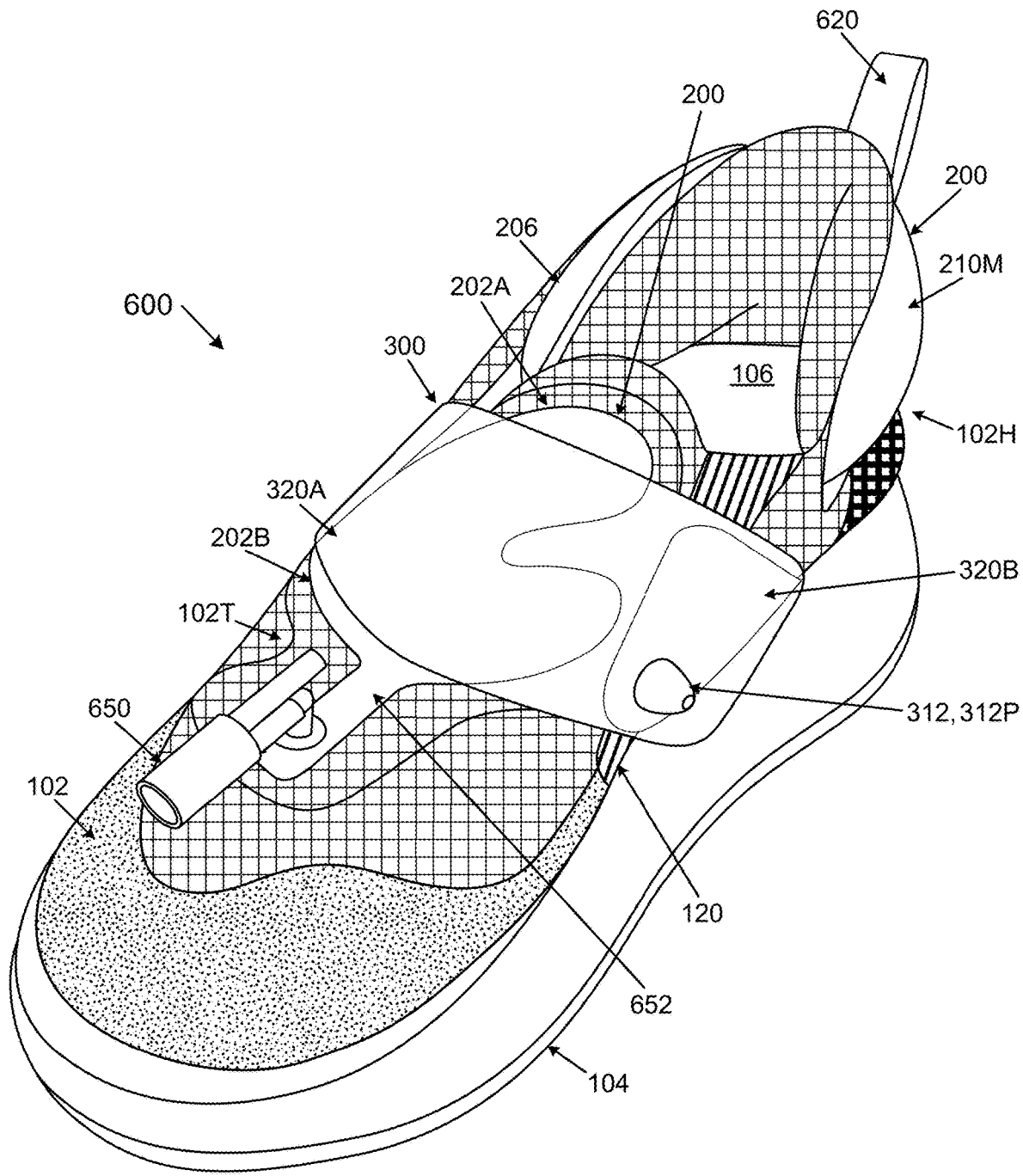
Figure 6D:
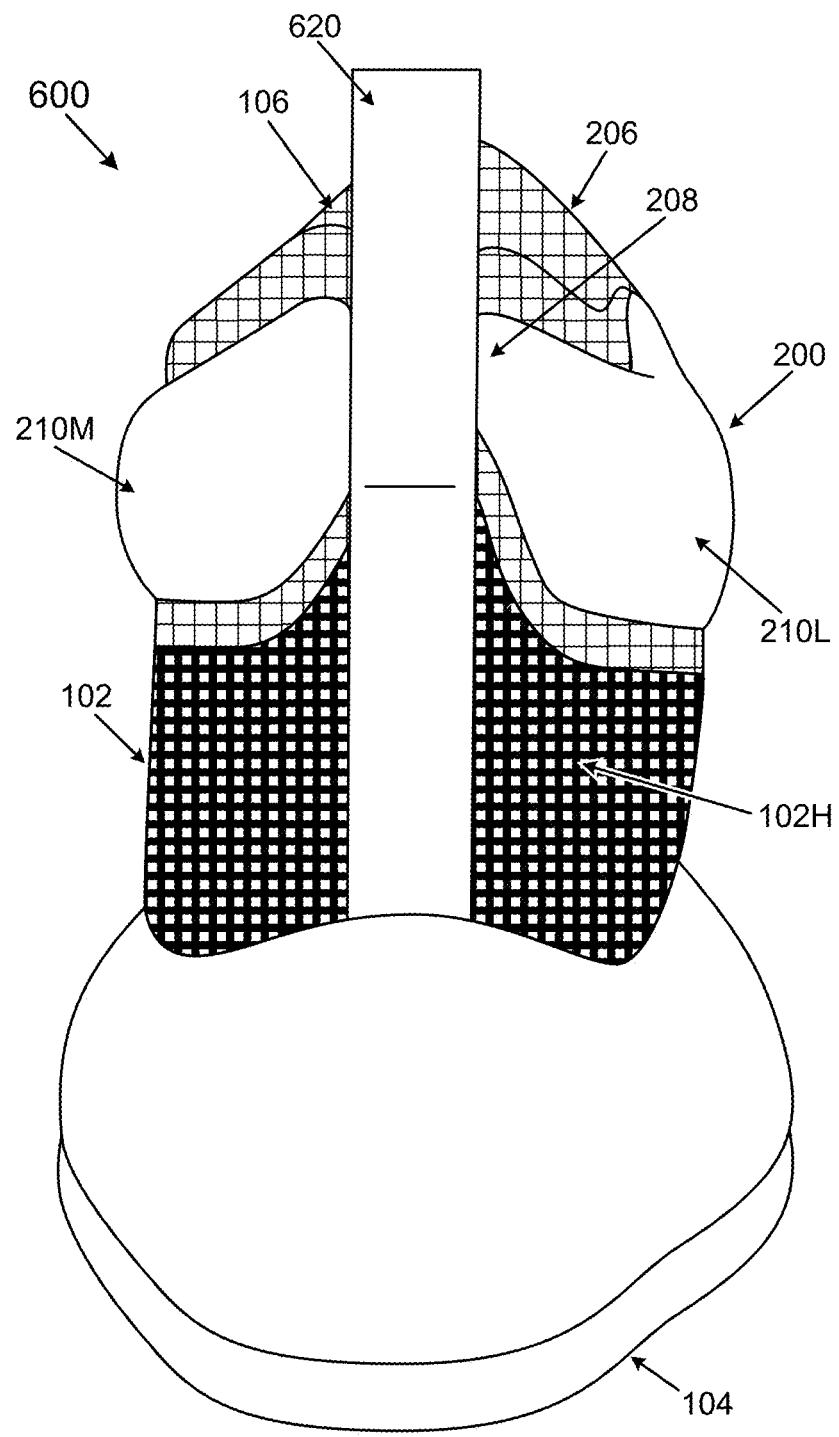

FIG. 6C further illustrates that the bladder 200 includes an inflation port 650 for introducing gas (or other fluid) into the sealed interior chamber 200I of the bladder 200. Such an inflation port 650 could remain in the final article of footwear 600 product, e.g., to allow changes to fluid volume, fluid mass, and fluid pressure in the article of footwear 600. But in some examples of this technology, after the bladder 200 is inflated to a desired pressure, the fluid line 652 extending between the bladder interior chamber 200I (at instep bladder chamber 202B in this example) and the inflation port 650 will be permanently sealed (e.g., by applying heat and pressure to close and seal fluid line 652). Then the inflation port 650 can be cut off. In such example structures, after the bladder 200 is inflated and sealed, the bladder 200 will include no fluid inlet and no fluid outlet, and thus the bladder 200 will contain a fixed mass of gas (or other fluid) within the sealed interior volume 200I. In other words, the bladder 200 will be a closed system in that no fluid enters or exits the overall bladder interior chamber 200I. The bladder 200 can be inflated before or after it is engaged with the footwear upper base 102.

Article of footwear 600 further includes a rear heel loop 620 (e.g., made from fabric and/or plastic materials) or other type of handle or grasping element, e.g., to assist in donning and doffing the article of footwear 600 on a wearer's foot.

The strap system 300 of the example of FIGS. 6A-6D differs from the strap system 300 described above in conjunction with FIGS. 1A-2C. Rather than a one-piece strap that turns through a retaining device 310, the strap system 300 of FIGS. 6A-6D includes two separate straps—strap 320A (e.g., a lateral anchored strap) and strap 320B (e.g., a medial anchored strap). Each of strap 320A and 320B includes (a) a first end fixedly secured (e.g., by stitching, by adhesive, by mechanical connector, etc.) to at least one of the footwear upper base 102 and/or the sole structure 104 (optionally sandwiched between the footwear upper base 102 and the sole structure 104) and (b) a free end that includes a portion 312P of a securing system 312 to secure the two straps 320A, 320B together in a tightened condition around a wearer's foot. Any type of securing system 312 may be used, such as a hook-and-loop type fastener, a buckle system, a button system, a snap fastener system, a zipper system, a mechanical fastener extending between openings in the two straps 320A, 320B (shown in FIG. 6B), etc. Additionally or alternatively, any type of material(s) may be used for the strap(s) 320A, 320B (and/or strap portions 302A, 302B of strap 302 discussed above), including textiles, plastics, webbing, etc. Stretchable material may be used for at least some portion(s) of the straps 302, 320A, 320B, or strap portions 302A, 302B, if desired, e.g., to allow the strap(s)/strap portion(s) to be pulled tight around a wearer's foot. In some examples of this technology, one or more straps 302, 320A, 320B, or strap portions 302A, 302B may include one or more rigid plates that is/are positionable to apply force to at least some portion of the bladder 200 (e.g., one or more of bladder chambers 202A, 202B) when the strap 302, 320A, 320B is positioned (e.g., tightened) around a wearer's foot. Additionally or alternatively, in some examples of this technology, a rigid plate could be provided as a separate component from the strap(s) 302, 320A, 320B, or strap portion(s) 302A, 302B, e.g., positioned between the strap(s) 302, 320A, 320B, or strap portion(s) 302A, 302B and a surface of the bladder 200. When present, the one or more rigid plates may be separated from the wearer's foot (e.g., instep) by fluid within the bladder 200 (e.g., to have the effect that the rigid plate(s) at the instep area is/are "floating" on the fluid in the bladder 200). The rigid plate(s), when present, may help spread out the force applied to the bladder 200 surface and/or moderate the feel of the strap(s) 302, 320A, 320B, or strap portion(s) 302A, 302B on the wearer's foot. Note also the discussion of rigid plate(s) 820 in conjunction with FIG. 8D below.

In the same general manner described above, in use, at least one of the two straps 320A, 320B may be tightened around a wearer's foot to a sufficient degree to apply force to a first major surface of at least one of the first instep chamber 202A or second instep chamber 202B. In this illustrated example, one strap (e.g., lateral anchored strap 320A) applies force to both the first and second instep chambers 202A, 202B, but other arrangements of the straps and instep chambers are possible. This force moves fluid within the bladder 200 toward and to the first heel and/or ankle support chamber (lateral chamber 210L in this example) and toward and to the second heel and/or ankle support chamber (medial chamber 210M in this example). Rear heel fluid line 208 moves fluid between the first heel and/or ankle support chamber 210L and the second heel and/or ankle support chamber 210M in this example. The movement of fluid increases fluid pressure and/or fluid volume in the lateral heel and/or ankle support chamber 210L and the medial heel and/or ankle support chamber 210M to thereby provide additional support for the wearer's heel and/or ankle and/or may improve comfort and/or fit. Notably, in this example structure, the fluid moves within the bladder 200 without the use of and/or need for a pump (manually operated or powered) to move the fluid.

Figure 7:
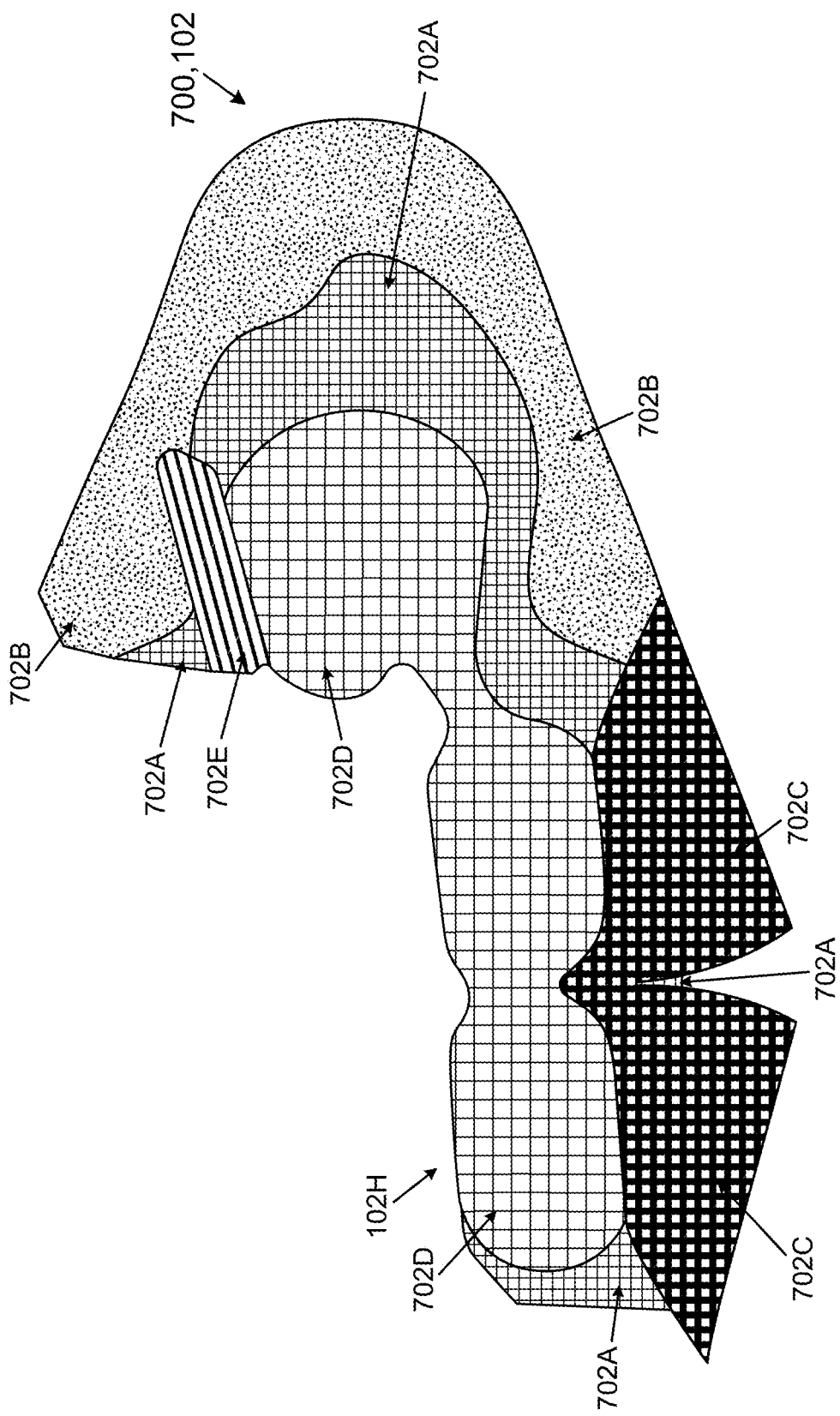
FIG. 7 provides information regarding materials and construction of a footwear upper base in accordance with some aspects of this technology.

FIG. 7 illustrates an upper blank 700 showing different potential fabrics or other materials for components of a footwear upper base 102 in accordance with some examples of this technology. Such a combination of components may be used, for example, in the articles of footwear 100 and 600 described above. FIG. 7 shows an upper blank 700 formed from five different fabric components 702A, 702B, 702C, 702D, and 702E that are fixed and engaged together in any appropriate manner (e.g., by one or more of sewing, adhesives, melt bonding, etc.). Fabric component 702A forms a base component of the footwear upper base 102, and this fabric component 702A may be formed, for example, from a fabric comprising a chenille fabric with medium sized mesh openings. This fabric component 702A forms instep and heel regions of the footwear upper base 102. If desired, the fabric component 702A may underlie some or all of other fabric components, e.g., some or all of fabric components 702B-702D.

A denser chenille fabric component 702B is engaged with the front and midfoot-to-forefoot sides of fabric component 702A in this example. This denser fabric component 702B provides enhanced durability and abrasion resistance and provides a stable and/or strong base for engaging one or more components of a sole structure 104. Another dense chenille fabric component 702C with small mesh openings is engaged with fabric component 702A at the heel-containing region 102H of the footwear upper base 102. Fabric component 702C also may provide durability, abrasion resistance, and/or a stable and/or strong base for engaging one or more sole structure 104 components.

Fabric component 702D comprises a thermoplastic polyurethane ("TPU") containing fabric component, e.g., a fabric component, optionally a knit fabric component, including at least one yarn formed from a TPU material and/or coated with a TPU material. This fabric component 702D forms a base for engaging components of a bladder (e.g., bladders 200, 450, 550 discussed above), e.g., in an adhesive free manner (e.g., in melt bonded or welded manners, using heat and pressure, or the like, as described above). Fabric component 702D may be formed as a mesh with relatively large openings, e.g., to enhance breathability.

Fabric component 702E of this example upper blank 700 is located at a medial side of the upper blank 700. Like fabric component 120 described above, fabric component 702E may comprise an elastic or elastomeric component, such as a stretchable chenille fabric, that helps provide comfort, stretches to enable easy donning and doffing, and/or helps hold the overall footwear upper to a wearer's foot.

Figure 8A:
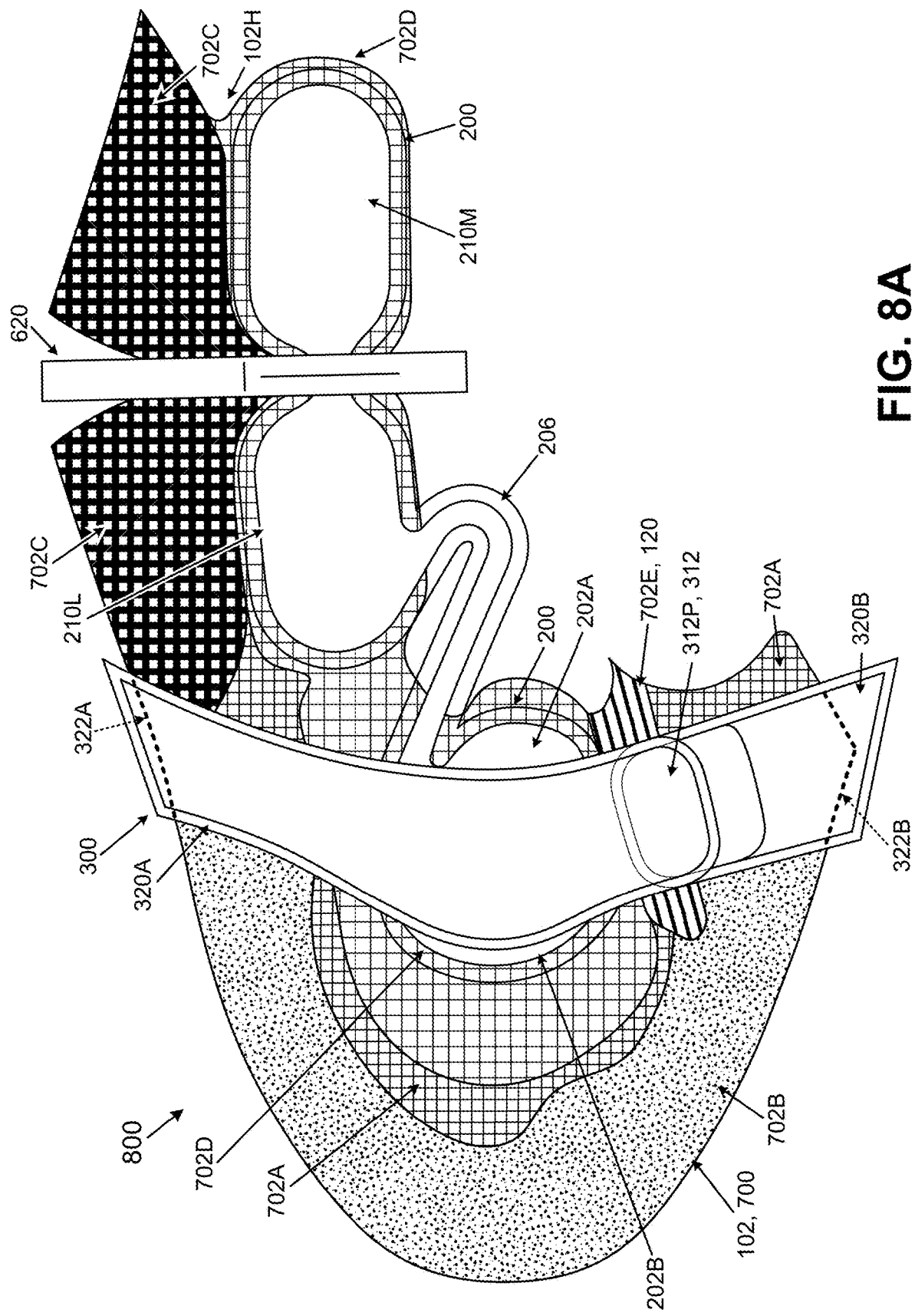
FIGS. 8A-8E provide information relating to the structure of components and methods of making footwear uppers and articles of footwear in accordance with some aspects of this technology.

FIG. 8A illustrates an overall footwear upper 800 as a footwear upper blank 700 with additional footwear components attached to it. FIGS. 8B-8E illustrate various component parts of the overall footwear upper 800 and features of the manner of making it. In a first step, the footwear upper blank 700 is formed, e.g., to the structure shown in FIG. 8B (and similar to the structure shown and described above in conjunction with FIG. 7). In this example, six component parts of the footwear upper blank 700 are engaged together, e.g., by one or more of sewing, adhesives, melt bonding (using heat and pressure), mechanical connectors (e.g., rivets, crimped metal rings, etc.), and the like. The six parts include components 702A (as a base component), 702B (as a forefoot and midfoot reinforcing component), 702C (as a heel reinforcing component), 702D (as a bladder support base component), 702E (as a stretch component to support foot insertion/removal), and heel loop 620. The component parts 702A-702E may be made from the materials described above in conjunction with FIG. 7 or with one or more other materials.

Figure 8B:
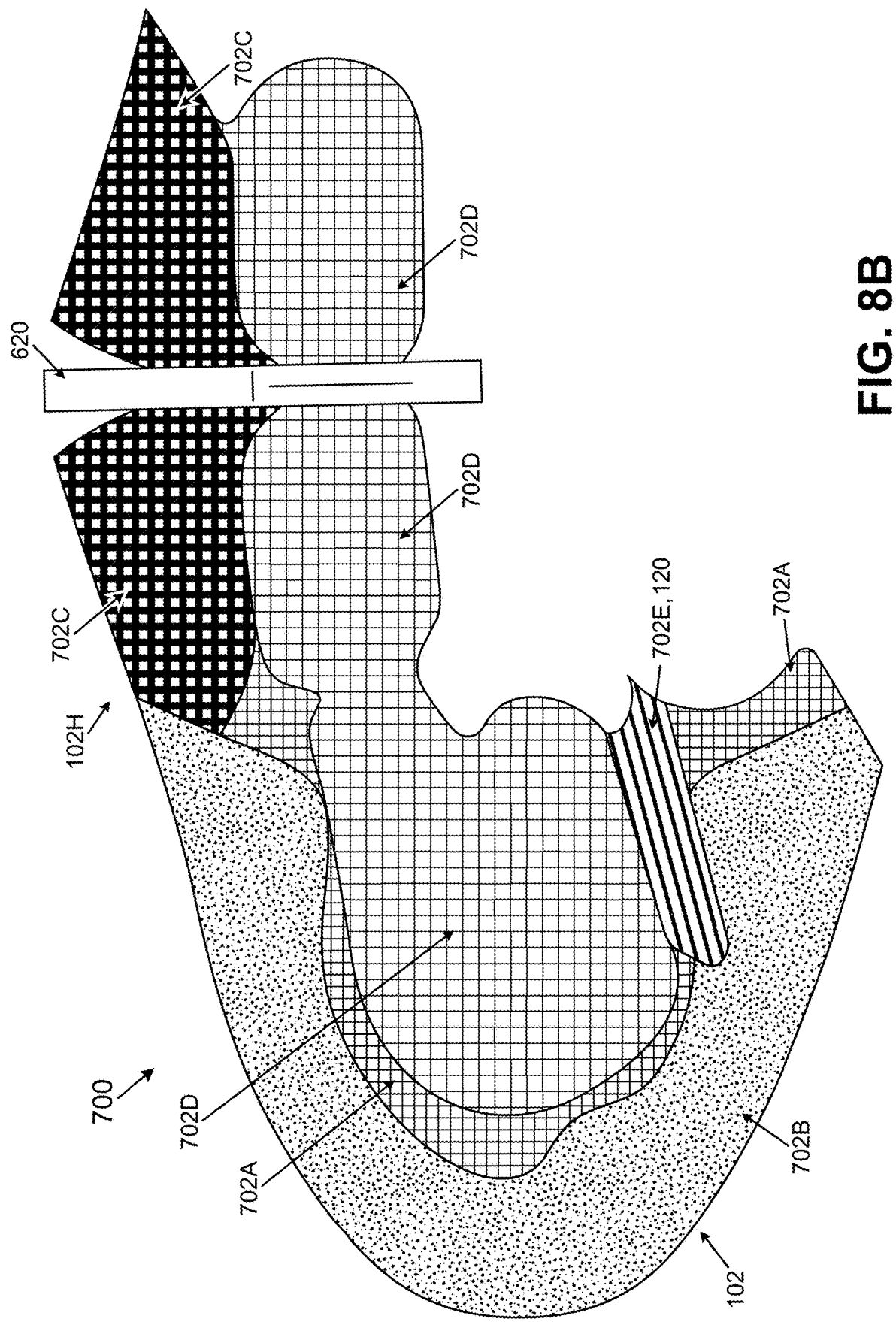
Figure 8C:
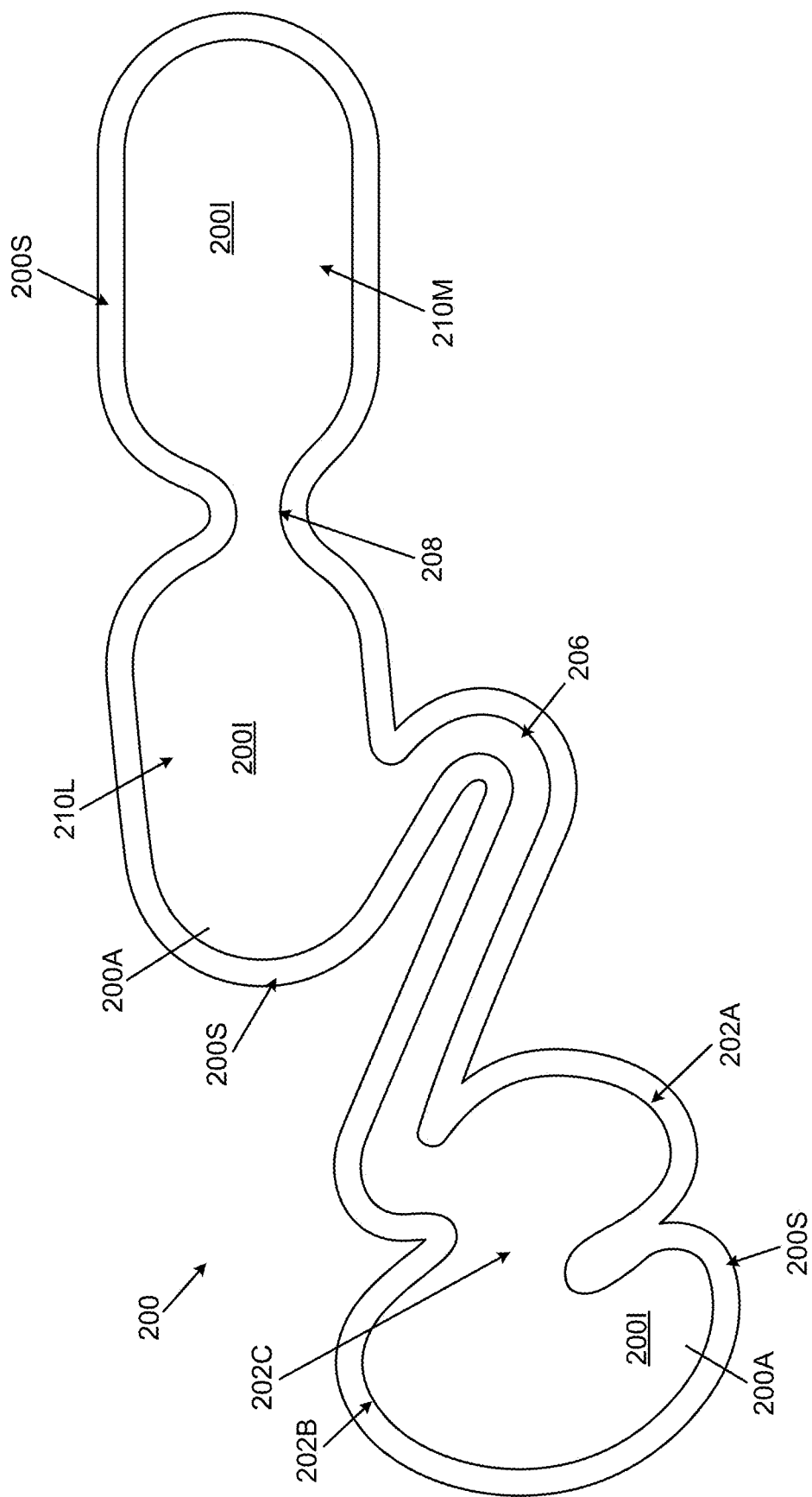

FIG. 8C shows an example bladder 200 component for this article of footwear (e.g., article of footwear 600). The bladder 200 includes a first thermoplastic sheet 200A (e.g., the top sheet; see FIG. 2D) and a second thermoplastic sheet 200B (e.g., a bottom sheet; see FIG. 2D) facing the first thermoplastic sheet 200A. The two thermoplastic sheets 200A, 200B (which may be formed from two (or more) separate sheets or a single sheet (e.g., folded over at one edge)) are sealed together by a continuous outer perimeter seam 200S. This sealed engagement can be accomplished using adhesives (e.g., using a hot melt adhesive) or in an adhesive free manner, e.g., using welding techniques (e.g., RF welding, ultrasonic welding), by melt bonding, etc.

The first thermoplastic sheet 200A, the second thermoplastic sheet 200B, and the continuous outer perimeter seam 200S define a sealed interior volume 200I for containing a gas or other fluid. The continuous outer perimeter seam 200S forms the outermost exterior perimeter of the bladder 200 in this example. As illustrated in FIG. 8C, the continuous outer perimeter seam 200S extends continuously to form the sealed interior volume 200I to include: (i) at least one fluid supply chamber (two chambers 202A and 202B shown connected by a connecting portion 202C) having a first major surface formed by the first thermoplastic sheet 200A (an outermost exterior surface of the bladder), (ii) a first heel and/or ankle support chamber (lateral heel and/or ankle support chamber 210L in this example), (iii) a first fluid line 206 connecting the fluid supply chamber(s) 202A, 202B and the first heel and/or ankle support chamber 210L through the sealed interior volume 200I, (iv) a second heel and/or ankle support chamber (medial heel and/or ankle support chamber 210M in this example), and (v) a second fluid line 208 connecting the first heel and/or ankle support chamber 210L and the second heel and/or ankle support chamber 210M through the sealed interior volume 200I. In the illustrated example bladder 200, all portions of the sealed interior volume 200I defined by the first thermoplastic sheet 200A, the second thermoplastic sheet 200B, and the continuous outer perimeter seam 200S are in fluid communication with one another. Also, while FIG. 8C shows bladder 200's thermoplastic sheets engaged together only by the continuous perimeter seam 200S, other seams may be provided, such as interior weld lines, weld dots, or weld regions, e.g., to provide shape control to the bladder 200.

As further shown in FIG. 8C, the first heel and/or ankle support chamber 210L and the second heel and/or ankle support chamber 210M are in fluid communication only via the second fluid line 208. In at least some examples of bladders 200, the bladder chambers and the sealed interior volume 200I may be sized and shaped such that one or both of a first volume defined by the first heel and/or ankle support chamber 210L and a second volume defined by the second heel and/or ankle support chamber 210M is/are at least 5 times greater than a third volume defined by the second fluid line 208 connecting chambers 210L and 210M. In still other examples, the first volume and/or the second volume will be at least 8 times greater, at least 10 times greater, at least 12 times greater, or even at least 15 times greater than the third volume. Additionally or alternatively, in at least some examples of bladders 200, an axial length of the second fluid line 208 from the first heel and/or ankle support chamber 210L to the second heel and/or ankle support chamber 210M will be less than 35 mm, and in some examples, less than 30 mm, less than 25 mm, less than 20 mm, or even less than 15 mm. The second fluid line 208 may have a length of at least 4 mm in the example ranges provided above.

Figure 8D:
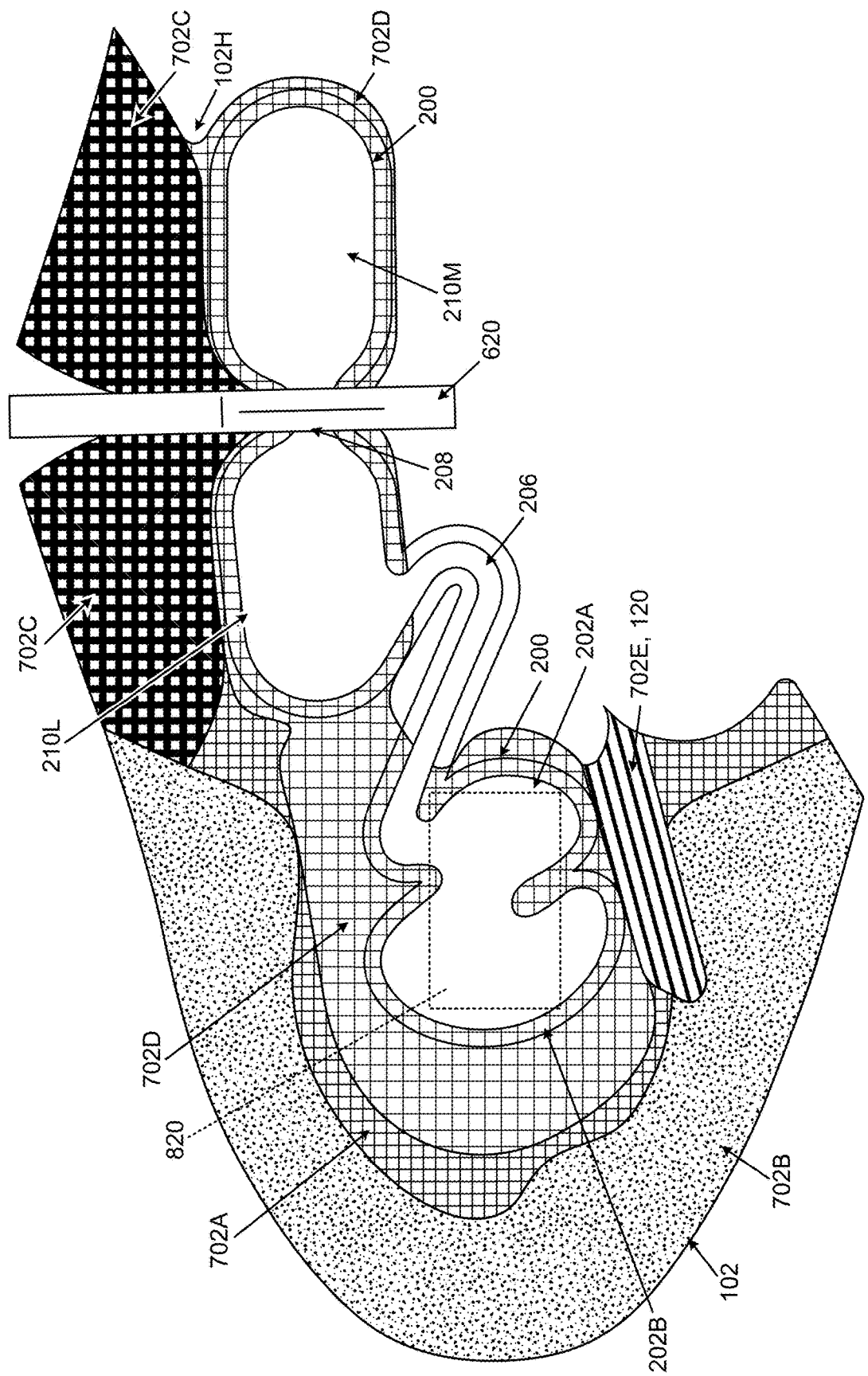

FIG. 8D illustrates the step of engaging the bladder 200 (e.g., of FIG. 8C) with the footwear upper base 102 (e.g., of FIG. 8B). In some examples, this step may occur when the footwear upper base 102 is in the form of the upper blank 700 (e.g., a flat upper blank 700) and the bladder 200 is in an uninflated condition. As some more specific examples, the uninflated bladder 200 can be positioned atop footwear upper base 102 fabric component 702D, which, as noted above, may be formed at least in part from a thermoplastic polyurethane ("TPU") containing fabric component, e.g., a fabric component, optionally a knit fabric component, including at least one yarn formed from a TPU material and/or coated with a TPU material. Heat and pressure may be applied, e.g., to locally melt the thermoplastic materials of the fabric component 702D and the bladder 200 to thereby melt and/or bond fabric component 702D and bladder 200 together in an adhesive free manner. Additionally or alternatively, other ways of engaging the footwear upper base 102 materials and the bladder 200 may be used, including adhesive based engagement, mechanical fasteners, sewn seams, or the like. Bonded engagement of bladder 200 with footwear upper base component 102 also may take place in any of the manners described in U.S. Patent Appln. No. 63/277,916, filed Nov. 10, 2021 and U.S. Patent Appln. No. 63/277,932, filed Nov. 10, 2021.

FIG. 8D further shows an optional rigid plate 820 (in broken lines) that may be provided (e.g., between one or more straps and a surface of the bladder 200 (e.g., in the instep area). One or more rigid plates 820 (e.g., one shown in FIG. 8D) may be engaged with one or more of the bladder 200, a strap 300, an upper base component (e.g., 702A, 702D), etc. The rigid plate(s) 820 may be at least partially covered by the strap(s) 302, 320A, 320B, or strap portion(s) 302A, 302B when the shoe is engaged with a wearer's foot. As described above, the rigid plate(s) 820 (which may be made from plastic, metal, etc.), when present, may help spread out the force applied to the bladder 200 surface and/or moderate the feel of the strap(s) 302, 320A, 320B, or strap portion(s) 302A, 302B on the wearer's foot. One or more rigid plates of the types described herein may be provided in any of the example structures of FIGS. 1A-10C.

Figure 8E:
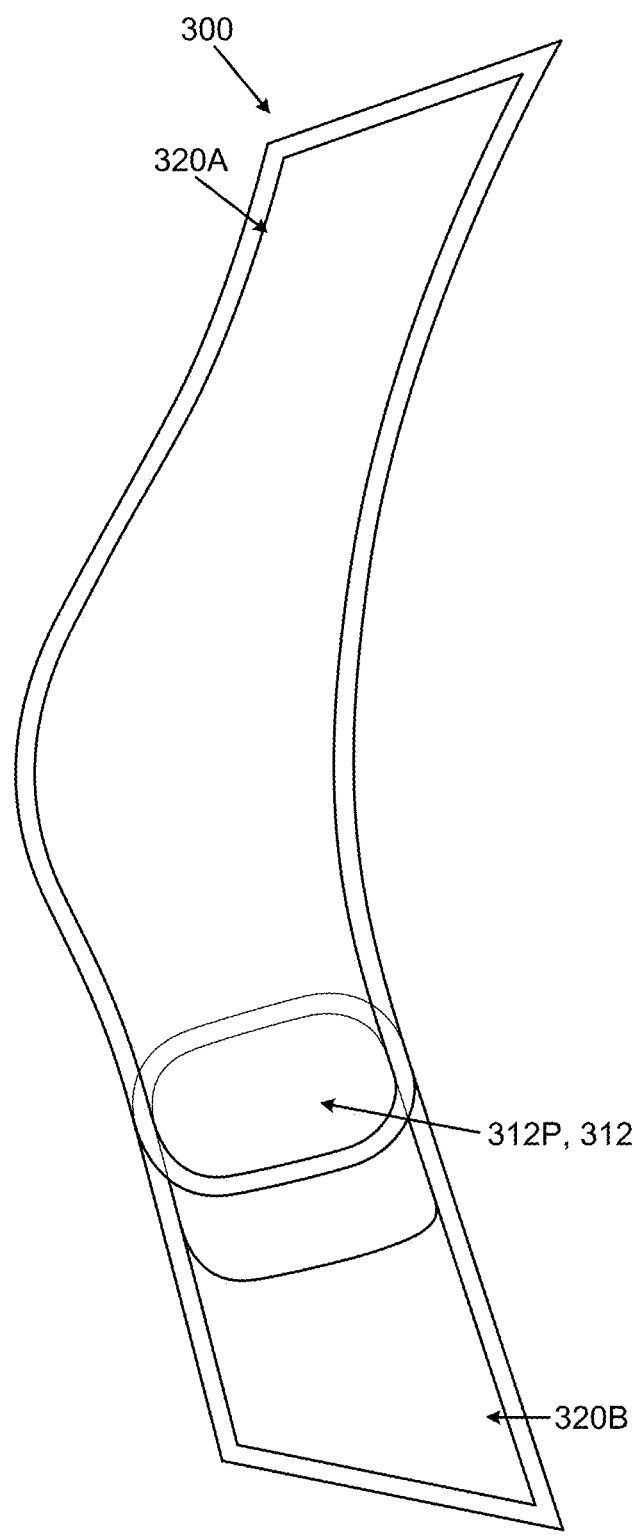

FIG. 8E illustrates two straps 320A, 320B of a strap system 300 that may be incorporated into a footwear upper 800 (e.g., engaged with one or more of the footwear upper base 102 components, such as one or more of components 702A, 702B, and/or 702C). Engagement may occur via one or more of sewn seams 322A, 322B (see FIG. 8A), adhesives, mechanical fasteners, or the like. Additionally or alternatively, if desired, the ends of either or both straps 320A, 320B may be engaged with the sole structure 104 of the article of footwear and/or sandwiched between the footwear upper (e.g., a bottom surface of the upper, one of components 702A-702D, etc.) and the sole structure 104. FIG. 8A illustrates the footwear upper 800 as an upper blank 700 (including footwear upper base 102 components 702A-702E) with the attached bladder 200 and the attached strap system 300. This footwear upper 800 optionally may be engaged with an upper bottom component (e.g., a strobel) by stitching and/or in another manner. Then, the overall footwear upper (including the bottom component) may be engaged with a sole structure 104 (e.g., as shown in FIGS. 6A-6D), e.g., in conventional manners as are known and used in the footwear art (e.g., by one or more of adhesives, mechanical connectors, sewn seams, etc.). Alternatively, as shown in the example of FIGS. 4 and 5, the footwear upper blank 700 may have a bottom component included as part of its structure (e.g., note bottom medial portion 402M and bottom lateral portion 402L in FIGS. 4 and 5).

Figure 9A:
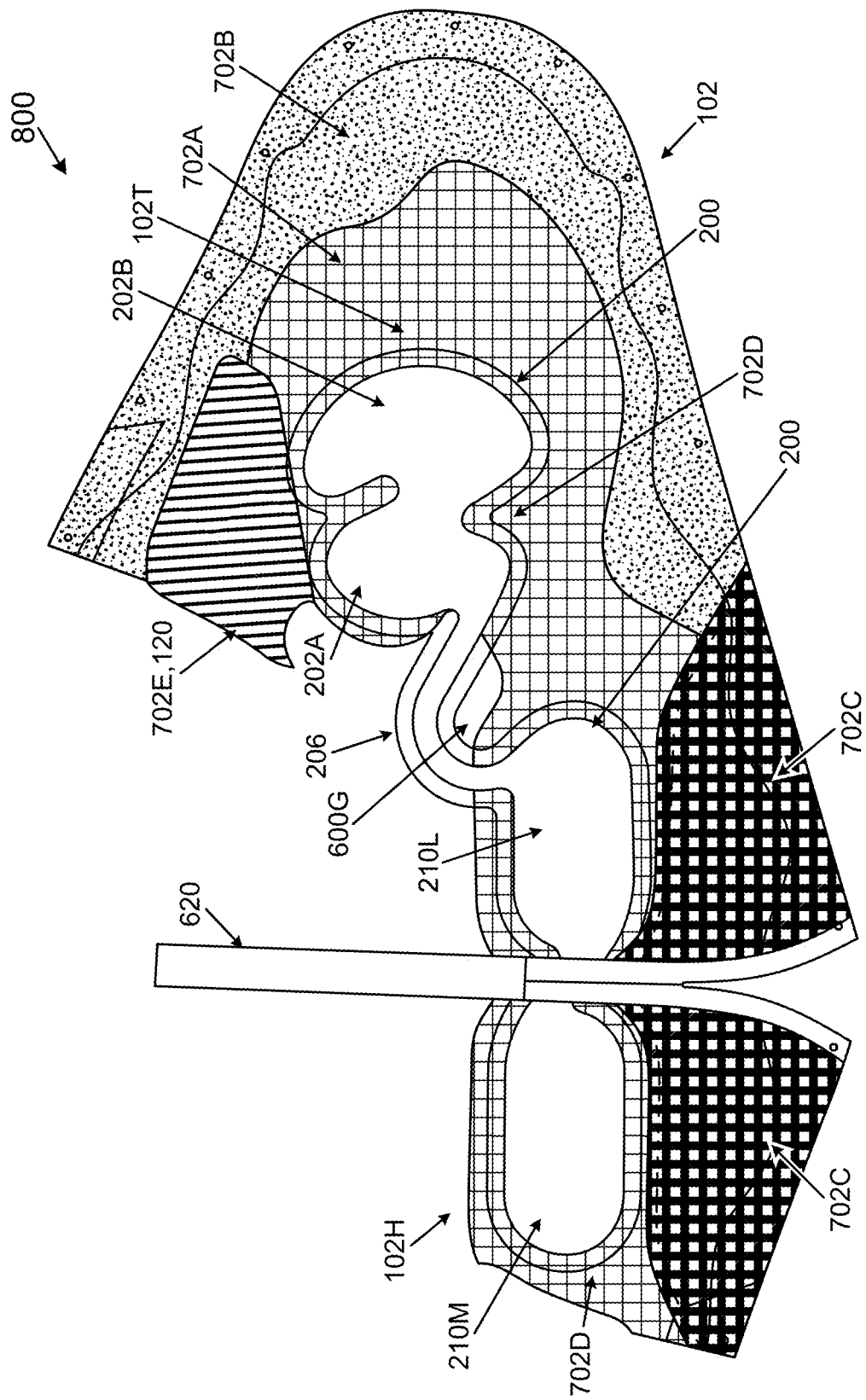
FIGS. 9A-9C provide various views of another example upper blank, footwear upper, and article of footwear in accordance with some aspects of this technology.
Figure 9B:
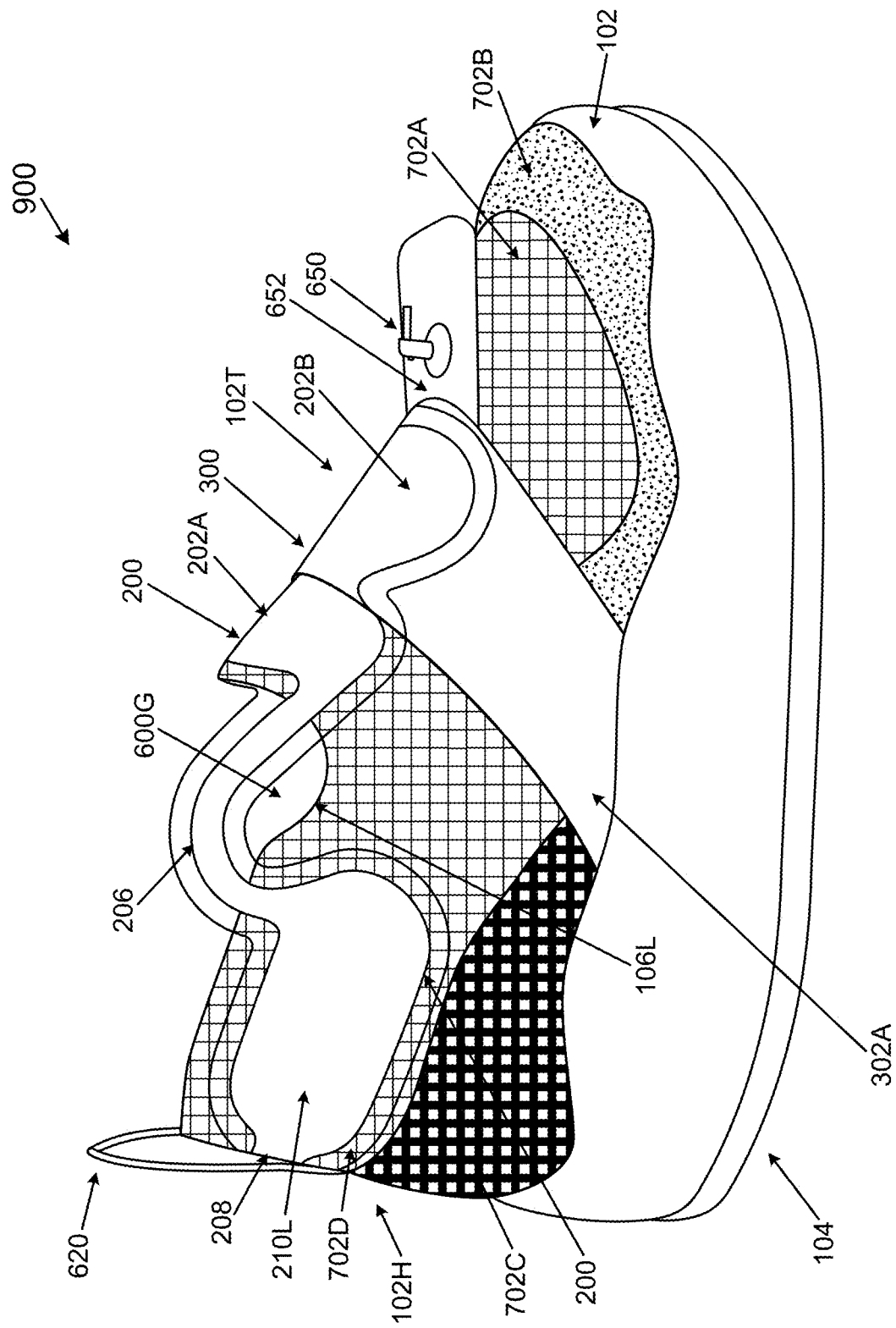
Figure 9C:
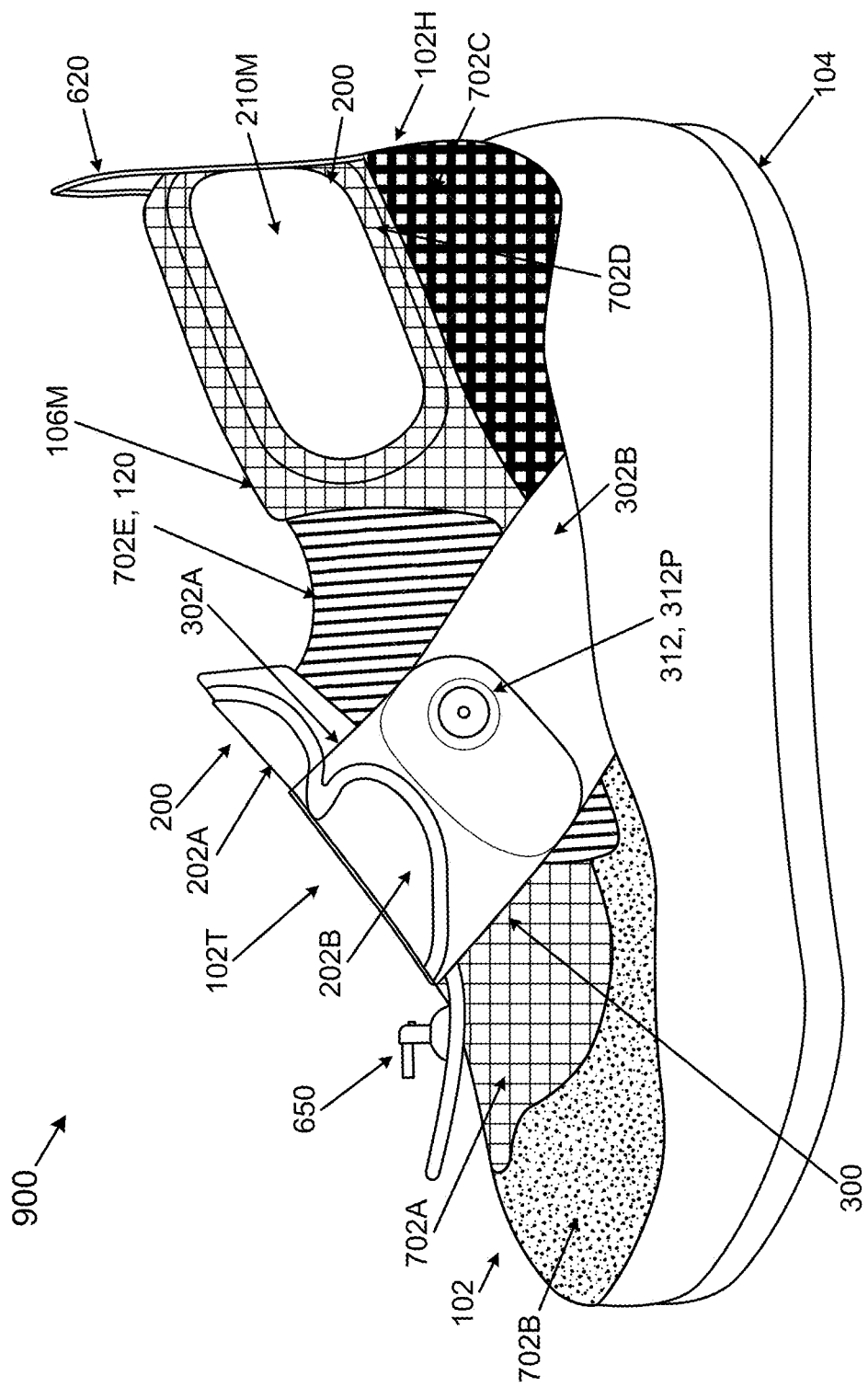

FIGS. 9A-9C illustrate another example article of footwear 900 and components thereof in accordance with some examples of this technology. Where the same reference numbers are used in FIGS. 9A-9C as are used in FIGS. 1A-8E, those reference numbers refer to the same or similar parts (with any of the options, alternatives, etc. as described for the parts above) and a more detailed description may be omitted. The following discussion of FIGS. 9A-9C will focus on differences from the examples above and/or features of the technology not fully discussed above.

FIG. 9A shows a footwear upper 800 including a footwear upper base 102 and attached bladder 200 but before the strap system 300 is attached. The medial side stretchable fabric component 702E, 120 in this illustrated example is somewhat larger than other examples described above, e.g., to allow greater stretch. FIGS. 9B and 9C show lateral and medial side views, respectively, of this footwear upper 800 engaged with a sole structure 104 to form the article of footwear 900. As illustrated in the example of FIGS. 9B and 9C, when attached to the footwear upper base 102 and the sole structure 104, the bladder 200 of this example is uninflated. Inflation through inflation port 650 can occur after the article of footwear 900 is assembled (and the inflation fluid line 652 can be sealed and the inflation port 650 removed, if desired). FIGS. 6A-6D provide various views of a similar article of footwear 600 after the bladder 200 is inflated.

Figure 10A:
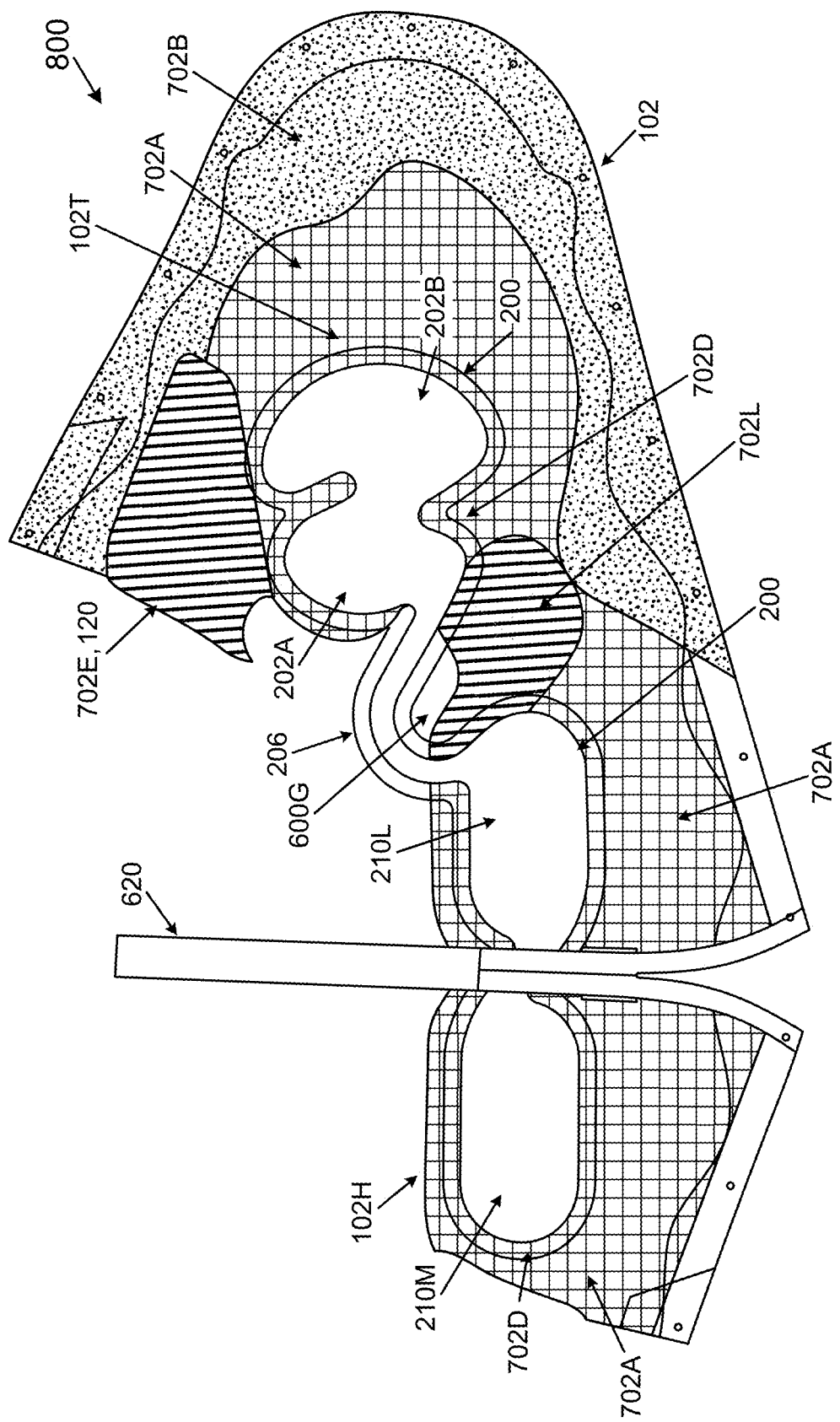
FIGS. 10A-10C provide various views of another example upper blank, footwear upper, and article of footwear in accordance with some aspects of this technology.
Figure 10B:
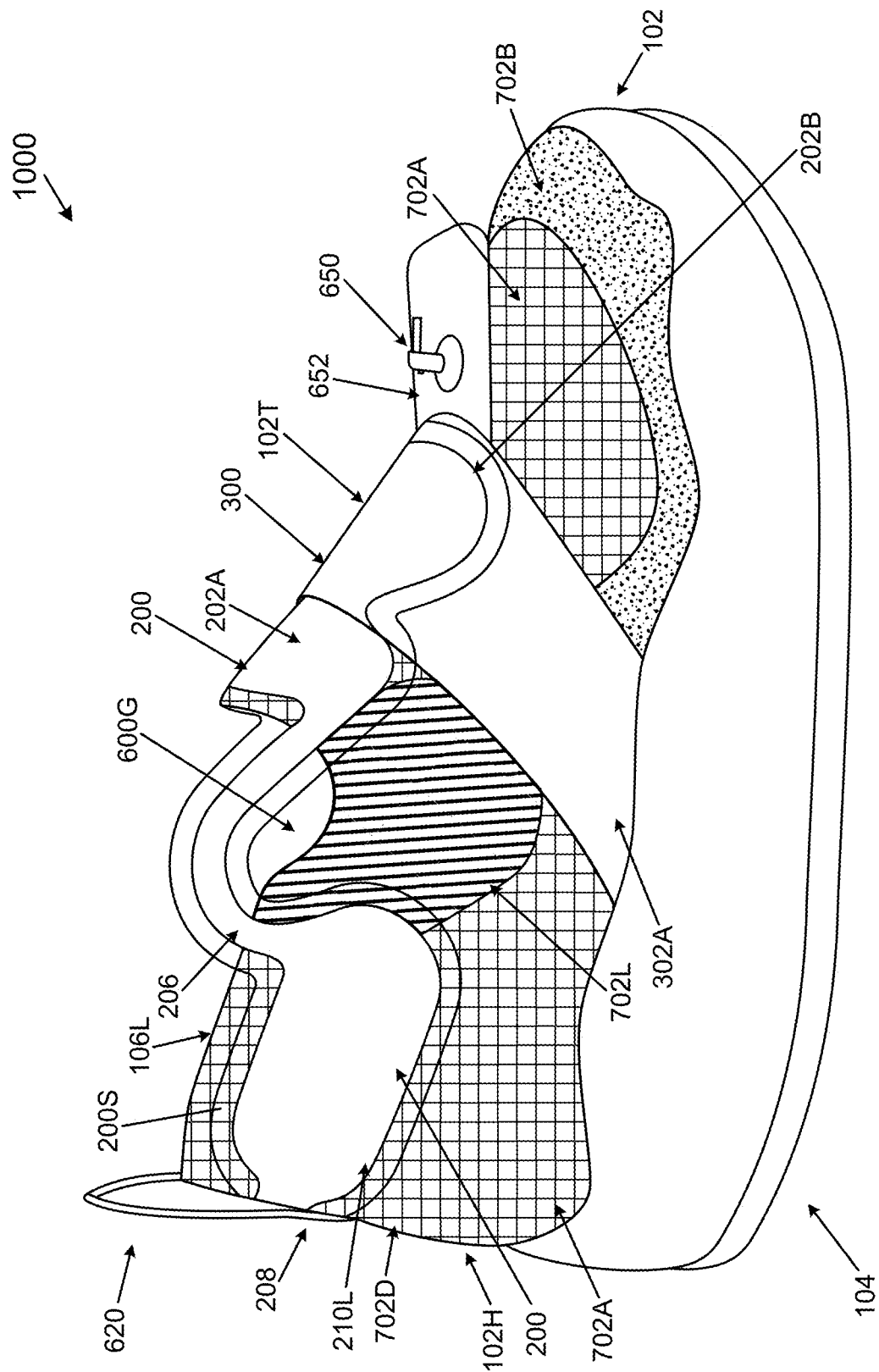
Figure 10C:
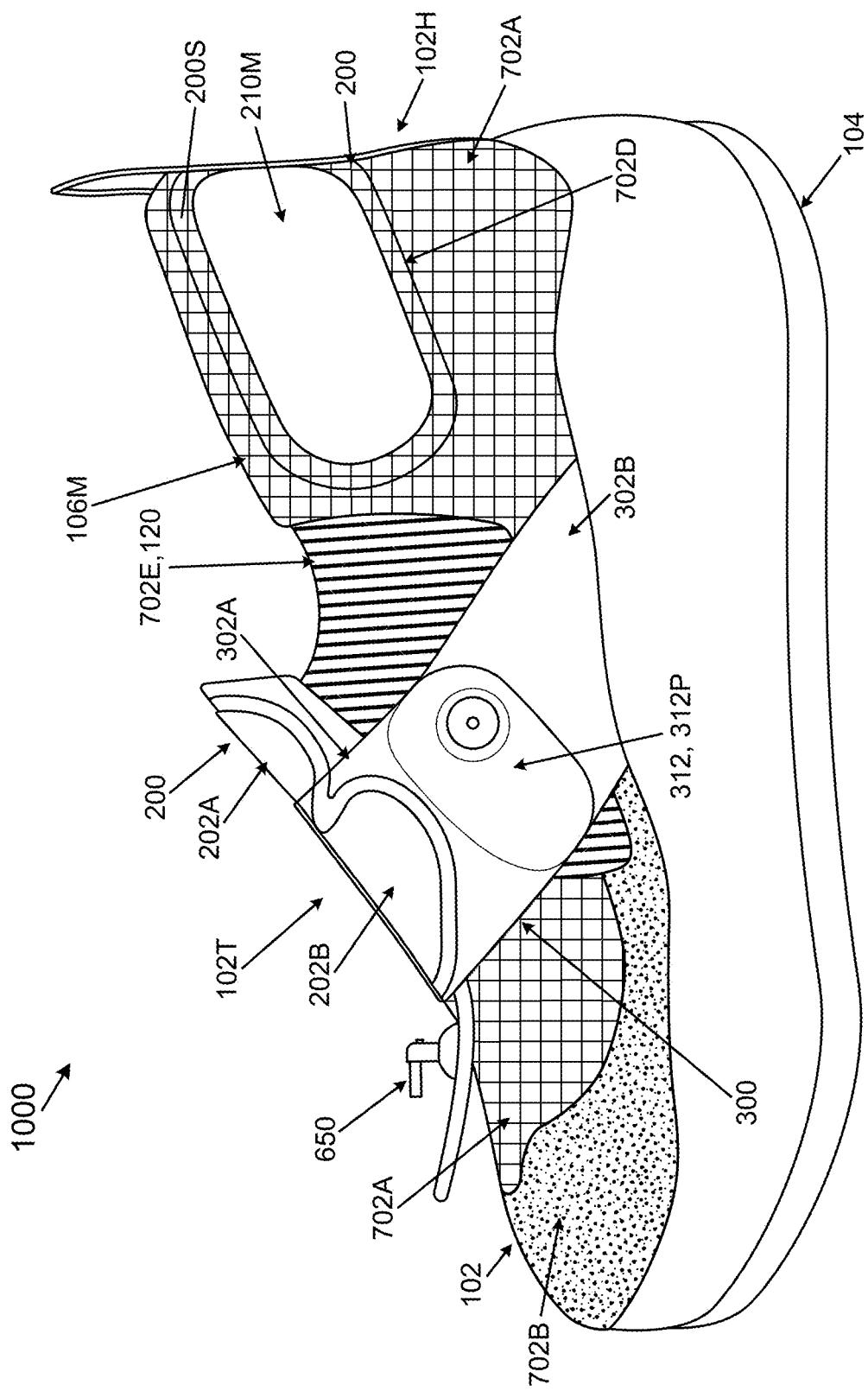

FIGS. 10A-10C illustrate another example article of footwear 1000 and components thereof in accordance with some examples of this technology. Where the same reference numbers are used in FIGS. 10A-10C as are used in FIGS. 1A-9C, those reference numbers refer to the same or similar parts (with any of the options, alternatives, etc. as described for the parts above) and a more detailed description may be omitted. The following discussion of FIGS. 10A-10C will focus on differences from the examples above and/or features of the technology not fully discussed above.

FIG. 10A shows a footwear upper 800 including a footwear upper base 102 and attached bladder 200 but before the strap system 300 is attached. FIGS. 10B and 10C show lateral and medial side views, respectively, of this footwear upper 800 engaged with a sole structure 104 to form the article of footwear 1000. The example upper 800 of FIGS. 10A-10C has heel reinforcing component 702C removed (or reduced in size) and the rear heel area (or much of it) is formed by fabric component 702A. Further, in this example upper 800, in addition to the medial side stretchable fabric component 702E, 120 located adjacent the medial side tongue area of the upper 800, this upper 800 includes a lateral side stretchable component 702L located adjacent the lateral side tongue area of the upper 800. Lateral side stretchable component 702L may be made from the same material as stretchable fabric component 702E, 120, if desired (e.g., an elastic or elastic-containing material). These stretchable components 702E, 702L provide adequate stretch to accommodate insertion and removal of a wearer's foot while still providing a good fit when the article of footwear 1000 is being worn.

Aspects of this technology are advantageous, e.g., because the footwear provides additional heel and/or ankle support using a simple system. In at least some examples of this technology, the interior bladder chamber 200I will be completely open to allow free movement of fluid under the applied forces. In the completed and inflated upper/article of footwear in accordance with some examples of this technology, no pumps (manually operated or powered), valves, electronics, and/or complicated and/or expensive mechanical/electrical parts are needed to provide the added heel and/or ankle support. Rather, the additional support can be activated simply by tightening the footwear to the wearer's foot.

While FIGS. 1-10C illustrate various different bladder sizes, shapes, and specific configurations, many variations in bladder sizes, shapes, and/or configurations are possible without departing from this technology. The specifically illustrated bladders could be varied widely in size, shape, and/or configuration while still providing the desired functions and/or properties described above.

III. Conclusion

The present invention is disclosed above and in the accompanying drawings with reference to a variety of example structures. The purpose served by the disclosure, however, is to provide examples of the various features and concepts related to the invention, not to limit the scope of the invention. One skilled in the relevant art will recognize that numerous variations and modifications may be made to the embodiments described above without departing from the scope of the present invention, as defined by the appended claims.

For the avoidance of doubt, the present application includes at least the subject matter described in the following numbered Clauses:

Clause 1. A footwear upper, comprising:
a footwear upper base formed from one or more component parts and including: (i) an instep region including at least one of a tongue base region or an instep base region and (ii) a heel-containing region; and
a bladder including: (i) a first instep chamber engaged with the instep region of the footwear upper base, (ii) a first heel and/or ankle support chamber engaged with the heel-containing region of the footwear upper base, and (iii) a first fluid line connecting the first instep chamber and the first heel and/or ankle support chamber and placing the first instep chamber in fluid communication with the first heel and/or ankle support chamber.

Clause 2. The footwear upper according to Clause 1, wherein the bladder further includes a second heel and/or ankle support chamber and a second fluid line connecting the first heel and/or ankle support chamber and the second heel and/or ankle support chamber and placing the first heel and/or ankle support chamber in fluid communication with the second heel and/or ankle support chamber.

Clause 3. The footwear upper according to Clause 2, wherein the first fluid line extends proximate to a medial side edge of a foot-receiving opening of the footwear upper base.

Clause 4. The footwear upper according to Clause 2 or 3, wherein the second fluid line extends around a rear heel and/or ankle portion of the footwear upper base, and wherein the second heel and/or ankle support chamber is located at a lateral heel and/or lateral ankle side of the footwear upper base.

Clause 5. The footwear upper according to Clause 2, wherein the first fluid line extends proximate to a lateral side edge of a foot-receiving opening of the footwear upper base.

Clause 6. The footwear upper according to Clause 5, wherein the second fluid line extends around a rear heel and/or ankle portion of the footwear upper base, and wherein the second heel and/or ankle support chamber is located at a medial heel and/or medial ankle side of the footwear upper base.

Clause 7. The footwear upper according to any one of Clauses 1 to 6, wherein the bladder further includes a second instep chamber engaged with the instep region of the footwear upper base, wherein the second instep chamber is in fluid communication with at least one of the first fluid line and the first instep chamber.

Clause 8. The footwear upper according to Clause 7, wherein a single continuous seam separates a first portion of the first instep chamber from a first portion of the second instep chamber.

Clause 9. The footwear upper according to Clause 8, wherein a second portion of the first instep chamber is separated from a second portion of the second instep chamber by an exposed portion of at least one of the one or more component parts of the footwear upper base.

Clause 10. The footwear upper according to any one of Clauses 7 to 9, wherein the bladder further defines a connecting fluid line, wherein a first end of the first instep chamber and a first end of the second instep chamber are in fluid communication with the connecting fluid line.

Clause 11. The footwear upper according to Clause 10, wherein the first instep chamber includes a second end located opposite the first end of the first instep chamber, wherein the second instep chamber includes a second end located opposite the first end of the second instep chamber, wherein the second end of the first instep chamber is separated from the second end of the second instep chamber by a gap defined in the bladder, and wherein at least one of the one or more component parts of the footwear upper base is exposed in the gap.

Clause 12. The footwear upper according to any one of Clauses 7 to 9, further comprising: a strap including a first strap portion that extends over a first major surface of the second instep chamber and a second strap portion that extends over a first major surface of the first instep chamber.

Clause 13. The footwear upper according to any one of Clauses 7 to 9, further comprising: (i) a retaining device located on a first side of the footwear upper base; and (ii) a strap including a first end located at a second side of the footwear upper base, wherein the strap includes a first strap portion that extends from the first end and over a first major surface of the second instep chamber, a second strap portion that engages the retaining device, and a third strap portion that extends over a first major surface of the first instep chamber.

Clause 14. The footwear upper according to Clause 13, further comprising: a securing system for securing the strap with respect to the footwear upper base.

Clause 15. The footwear upper according to Clause 13, further comprising: a securing system engaged with the third strap portion and/or located proximate a second end of the strap, wherein the second end of the strap is an opposite end from the first end, the securing system configured to hold the strap in a tightened condition.

Clause 16. The footwear upper according to Clause 14 or 15, wherein the securing system includes at least one member selected from the group consisting of: a hook-and-loop fastener, a button fastener, a snap fastener, and a buckle fastener.

Clause 17. The footwear upper according to any one of Clauses 13 to 16, wherein the first side is a medial side of the footwear upper and the second side is a lateral side of the footwear upper.

Clause 18. The footwear upper according to any one of Clauses 12 to 17, wherein force applied to the first instep chamber and/or the second instep chamber by the strap moves fluid within the bladder to increase fluid pressure and/or fluid volume at least in the first heel and/or ankle support chamber.

Clause 19. The footwear upper according to any one of Clauses 1 to 6, wherein the bladder further includes: (i) a second instep chamber engaged with the instep region of the footwear upper base, and (ii) a second heel and/or ankle support chamber engaged with the heel-containing region of the footwear upper base and in fluid communication with the second instep chamber.

Clause 20. The footwear upper according to Clause 19, wherein the bladder further includes a fluid transfer line connecting the second instep chamber and the second heel and/or ankle support chamber, wherein the first fluid line extends along a first side of the footwear upper and the fluid transfer line extends along a second side of the footwear upper.

Clause 21. The footwear upper according to Clause 19 or 20, wherein the first instep chamber defines a first central axial direction and the second instep chamber defines a second central axial direction.

Clause 22. The footwear upper according to Clause 21, wherein the first central axial direction and the second central axial direction are substantially parallel.

Clause 23. The footwear upper according to any one of Clauses 19 to 22, wherein the first instep chamber includes a first free end, and wherein the second instep chamber includes a second free end.

Clause 24. The footwear upper according to Clause 23, wherein at least one of the first free end and the second free end forms a forwardmost extent of the bladder on the footwear upper base.

Clause 25. The footwear upper according to any one of Clauses 19 to 22, wherein the second instep chamber is a multi-bulbed chamber having a plurality of fluid bulbs in fluid communication with one another.

Clause 26. The footwear upper according to Clause 25, wherein the first instep chamber is a multi-bulbed chamber having a plurality of fluid bulbs in fluid communication with one another, and wherein a single continuous seam in the bladder separates one bulb of the first instep chamber from one bulb of the second instep chamber.

Clause 27. The footwear upper according to any one of Clauses 1 to 26, wherein the first instep chamber is a multi-bulbed chamber having a plurality of fluid bulbs in fluid communication with one another.

Clause 28. The footwear upper according to any one of Clauses 1 to 27, wherein the first heel and/or ankle support chamber is located at a medial heel and/or medial ankle side of the footwear upper base.

Clause 29. The footwear upper according to any one of Clauses 1 to 27, wherein the first heel and/or ankle support chamber is located at a lateral heel and/or lateral ankle side of the footwear upper base.

Clause 30. The footwear upper according to any one of Clauses 1 to 29, wherein the bladder is located inside an outermost layer of the footwear upper base.

Clause 31. The footwear upper according to any one of Clauses 1 to 29, wherein at least a majority of a surface area of the bladder is located inside an outermost layer of the footwear upper base.

Clause 32. The footwear upper according to any one of Clauses 1 to 31, wherein one or more of the component parts of the footwear upper base comprise a first knit component, and wherein at least a first portion of the bladder is engaged with the first knit component.

Clause 33. The footwear upper according to Clause 32, wherein the first portion of the bladder is engaged with the first knit component in an adhesive-free manner.

Clause 34. An article of footwear, comprising:
 a footwear upper according to any one of Clauses 1 to 33; and
 a sole structure engaged with the footwear upper.

Clause 35. A bladder, comprising:
 a first thermoplastic sheet;
 a second thermoplastic sheet facing the first thermoplastic sheet; and
 a continuous outer perimeter seam sealing the first thermoplastic sheet to the second thermoplastic sheet, wherein the continuous outer perimeter seam defines a sealed interior volume between the first thermoplastic sheet and the second thermoplastic sheet, and wherein the continuous outer perimeter seam extends continuously to form the sealed interior volume to include: (i) a fluid supply chamber having a first major surface formed by the first thermoplastic sheet, (ii) a first heel and/or ankle support chamber, (iii) a first fluid line connecting the fluid supply chamber and the first heel and/or ankle support chamber through the sealed interior volume, (iv) a second heel and/or ankle support chamber, and (v) a second fluid line connecting the fluid supply chamber and the second heel and/or ankle support chamber through the sealed interior volume.

Clause 36. The bladder according to Clause 35, wherein the continuous outer perimeter seam extends to form the fluid supply chamber as a multi-bulbed chamber.

Clause 37. The bladder according to Clause 36, wherein the first fluid line connects to a first bulb of the multi-bulbed chamber and the second fluid line connects to a second bulb of the multi-bulbed chamber.

Clause 38. The bladder according to any one of Clauses 35 to 37, wherein the continuous outer perimeter seam extends to form the first heel and/or ankle support chamber as a multi-bulbed chamber.

Clause 39. The bladder according to any one of Clauses 35 to 38, wherein the continuous outer perimeter seam extends to form the second heel and/or ankle support chamber as a multi-bulbed chamber.

Clause 40. The bladder according to any one of Clauses 35 to 39, wherein the continuous outer perimeter seam extends to form the fluid supply chamber as two parallel chamber regions.

Clause 41. The bladder according to any one of Clauses 35 to 39, wherein the continuous outer perimeter seam extends to form the fluid supply chamber as at least two parallel chamber regions each having multiple bulbs.

Clause 42. The bladder according to any one of Clauses 35 to 40, wherein the continuous outer perimeter seam extends to form the fluid supply chamber as a first chamber region having multiple bulbs including a first bulb and a second chamber region having multiple bulbs including a second bulb, and wherein the continuous perimeter seam extends directly from the first bulb to the second bulb.

Clause 43. The bladder according to Clause 42, wherein a hole is defined through the bladder at a location adjacent a location where the continuous perimeter seam extends directly from the first bulb to the second bulb.

Clause 44. The bladder according to any one of Clauses 35 to 42, wherein the first thermoplastic sheet and the second thermoplastic sheet are connected only by the continuous outer perimeter seam.

Clause 45. The bladder according to any one of Clauses 35 to 42, wherein the continuous outer perimeter seam connects the first thermoplastic sheet and the second thermoplastic sheet in an adhesive free manner.

Clause 46. The bladder according to any one of Clauses 35 to 45, wherein all portions of the sealed interior volume defined by the first thermoplastic sheet, the second thermoplastic sheet, and the continuous outer perimeter seam are in fluid communication.

Clause 47. The bladder according to any one of Clauses 35 to 46, wherein the first thermoplastic sheet and the second thermoplastic sheet are formed from a single thermoplastic sheet.

Clause 48. The bladder according to any one of Clauses 35 to 46, wherein the first thermoplastic sheet and the second thermoplastic sheet are formed from separate thermoplastic sheets.

Clause 49. The bladder according to any one of Clauses 35 to 48, wherein the fluid supply chamber and the first heel and/or ankle support chamber are in fluid communication only via the first fluid line.

Clause 50. The bladder according to any one of Clauses 35 to 49, wherein the fluid supply chamber and the second heel and/or ankle support chamber are in fluid communication only via the second fluid line.

Clause 51. The bladder according to any one of Clauses 35 to 50, further comprising: an inflation port that is permanently sealed after the bladder is inflated, wherein after inflation and sealing, the bladder includes no gas inlet and no gas outlet and contains a fixed mass of gas within the sealed interior volume.

Clause 52. A footwear upper, comprising:
 a footwear upper base formed from one or more component parts and including: (i) an instep region including at least one of a tongue base region or an instep base region and (ii) a heel-containing region; and
 a bladder according to any one of Clauses 35 to 51 engaged with the footwear upper base, wherein the fluid supply chamber is engaged at the instep region, the first heel and/or ankle support chamber is engaged at a lateral side of the heel-containing region, and the second heel and/or ankle support chamber is engaged at a medial side of the heel-containing region.

Clause 53. The footwear upper according to Clause 52, wherein the one or more component parts of the footwear upper base includes a first component part, and wherein at least a portion of the bladder is engaged with the first component part.

Clause 54. The footwear upper according to Clause 53, wherein the portion of the bladder engaged with the first component part is engaged in an adhesive free manner.

Clause 55. The footwear upper according to Clause 53 or 54, wherein the first component part is a knit component.

Clause 56. An article of footwear, comprising: (i) a footwear upper according to any one of Clauses 52 to 55; and (ii) a sole structure engaged with the footwear upper.

Clause 57. A footwear upper, comprising:
 a footwear upper base formed from one or more component parts and including: (i) an instep region including at least one of a tongue base region or an instep base region and (ii) a heel-containing region;
 a bladder including: (i) a first instep chamber engaged with the instep region of the footwear upper base, (ii) a first heel and/or ankle support chamber engaged with the heel-containing region of the footwear upper base, and (iii) a first fluid line connecting the first instep chamber and the first heel and/or ankle support chamber and placing the first instep chamber in fluid communication with the first heel and/or ankle support chamber; and
 a strap system including a first strap portion structured and configured to extend across a first major surface of the first instep chamber.

Clause 58. The footwear upper according to Clause 57, wherein the bladder further includes a second heel and/or ankle support chamber and a second fluid line connecting the first heel and/or ankle support chamber and the second heel and/or ankle support chamber and placing the first heel and/or ankle support chamber in fluid communication with the second heel and/or ankle support chamber.

Clause 59. The footwear upper according to Clause 58, wherein the first fluid line extends proximate to a lateral side edge of a foot-receiving opening of the footwear upper base.

Clause 60. The footwear upper according to Clause 58 or 59, wherein the second fluid line extends around a rear heel and/or ankle portion of the footwear upper base, and wherein the second heel and/or ankle support chamber is located at a medial heel and/or medial ankle side of the footwear upper base.

Clause 61. The footwear upper according to Clause 58, wherein the first fluid line extends proximate to a medial side edge of a foot-receiving opening of the footwear upper base.

Clause 62. The footwear upper according to Clause 58 or 59, wherein the second fluid line extends around a rear heel and/or ankle portion of the footwear upper base, and wherein the second heel and/or ankle support chamber is located at a lateral heel and/or lateral ankle side of the footwear upper base.

Clause 63. The footwear upper according to any one of Clauses 58 to 62, wherein the bladder further includes a second instep chamber engaged with the instep region of the footwear upper base, wherein the second instep chamber is in fluid communication with at least one of the first fluid line and the first instep chamber.

Clause 64. The footwear upper according to Clause 63, wherein force applied to at least one of the first instep chamber and the second instep chamber by the strap system moves fluid within the bladder to increase fluid pressure and/or fluid volume in at least one of the first heel and/or ankle support chamber and the second heel and/or ankle support chamber.

Clause 65. The footwear upper according to any one of Clauses 58 to 63, wherein force applied to the first instep chamber by the strap system moves fluid within the bladder to increase fluid pressure and/or fluid volume in at least one of the first heel and/or ankle support chamber and the second heel and/or ankle support chamber.

Clause 66. The footwear upper according to any one of Clauses 58 to 63, wherein force applied to the first instep chamber by the strap system moves fluid within the bladder to increase fluid pressure and/or fluid volume in the first heel and/or ankle support chamber.

Clause 67. The footwear upper according to Clause 57, wherein the bladder further includes: (i) a second instep chamber engaged with the instep region of the footwear upper base, and (ii) a second heel and/or ankle support chamber engaged with the heel-containing region of the footwear upper base and in fluid communication with the second instep chamber.

Clause 68. The footwear upper according to Clause 67, wherein the bladder further includes a fluid transfer line connecting the second instep chamber and the second heel and/or ankle support chamber, wherein the first fluid line extends along a first side of the footwear upper and the fluid transfer line extends along a second side of the footwear upper.

Clause 69. The footwear upper according to Clause 67 or 68, wherein force applied to at least one of the first instep chamber and the second instep chamber by the strap system moves fluid within the bladder to increase fluid pressure and/or fluid volume in at least one of the first heel and/or ankle support chamber and the second heel and/or ankle support chamber.

Clause 70. The footwear upper according to any one of Clauses 57 to 69, wherein at least a portion of the first fluid line is unsupported by any footwear upper base component and consists of only bladder material.

Clause 71. The footwear upper according to any one of Clauses 57 to 70, wherein the footwear upper base defines a foot-receiving opening of the footwear upper, and wherein the first fluid line extends above the foot-receiving opening over at least a portion of a length of the first fluid line.

Clause 72. The footwear upper according to any one of Clauses 57 to 71, wherein the strap system includes a first strap and a second strap, wherein at least one of the first strap or the second strap is structured and arranged to apply force to a first major surface of the first instep chamber.

Clause 73. The footwear upper according to any one of Clauses 57 to 71, wherein the strap system includes at least a first strap that is structured and arranged to apply force to the first major surface of the first instep chamber.

Clause 74. The footwear upper according to any one of Clauses 57 to 73, wherein one component of the one or more component parts of the footwear upper base comprises a first knit component, and wherein at least a first portion of the bladder is engaged with the first knit component.

Clause 75. The footwear upper according to Clause 74, wherein the first portion of the bladder is engaged with the first knit component in an adhesive-free manner.

Clause 76. An article of footwear, comprising: (i) a footwear upper according to any one of Clauses 57 to 75; and (ii) a sole structure engaged with the footwear upper.

Clause 77. A bladder, comprising:
a first thermoplastic sheet;
a second thermoplastic sheet facing the first thermoplastic sheet; and
a continuous outer perimeter seam sealing the first thermoplastic sheet to the second thermoplastic sheet, wherein the continuous outer perimeter seam defines a sealed interior volume between the first thermoplastic sheet and the second thermoplastic sheet, and wherein the continuous outer perimeter seam extends continuously to form the sealed interior volume to include: (i) a fluid supply chamber having a first major surface formed by the first thermoplastic sheet, (ii) a first heel and/or ankle support chamber, (iii) a first fluid line connecting the fluid supply chamber and the first heel and/or ankle support chamber through the sealed interior volume, (iv) a second heel and/or ankle support chamber, and (v) a second fluid line connecting the first heel and/or ankle support chamber and the second heel and/or ankle support chamber through the sealed interior volume.

Clause 78. The bladder according to Clause 77, wherein each of a first volume defined by the first heel and/or ankle support chamber and a second volume defined by the second heel and/or ankle support chamber is at least 5 times greater than a third volume defined by the second fluid line.

Clause 79. The bladder according to Clause 77 or 78, wherein an axial length of the second fluid line from the first heel and/or ankle support chamber to the second heel and/or ankle support chamber is less than 25 mm.

Clause 80. The bladder according to any one of Clauses 77 to 79, wherein the continuous outer perimeter seam extends to form the fluid supply chamber as a multi-bulbed chamber.

Clause 81. The bladder according to any one of Clauses 77 to 80, wherein the continuous outer perimeter seam joins the first thermoplastic sheet and the second thermoplastic sheet in an adhesive free manner.

Clause 82. The bladder according to any one of Clauses 77 to 80, wherein the first thermoplastic sheet and the second thermoplastic sheet are connected only by the continuous outer perimeter seam.

Clause 83. The bladder according to any one of Clauses 77 to 82, wherein all portions of the sealed interior volume defined by the first thermoplastic sheet, the second thermoplastic sheet, and the continuous outer perimeter seam are in fluid communication.

Clause 84. The bladder according to any one of Clauses 77 to 83, wherein the first thermoplastic sheet and the second thermoplastic sheet are formed from a single thermoplastic sheet.

Clause 85. The bladder according to any one of Clauses 77 to 83, wherein the first thermoplastic sheet and the second thermoplastic sheet are formed from separate thermoplastic sheets.

Clause 86. The bladder according to any one of Clauses 77 to 85, wherein the first heel and/or ankle support chamber and the second heel and/or ankle support chamber are in fluid communication only via the second fluid line.

Clause 87. The bladder according to any one of Clauses 77 to 86, further comprising: an inflation port that is permanently sealed after the bladder is inflated, wherein after inflation and sealing, the bladder includes no gas inlet and no gas outlet and contains a fixed mass of gas within the sealed interior volume.

Clause 88. A footwear upper, comprising:
a footwear upper base formed from one or more component parts and including: (i) an instep region including at least one of a tongue base region or an instep base region and (ii) a heel-containing region; and
a bladder according to any one of Clauses 77 to 87 engaged with the footwear upper base, wherein the fluid supply chamber is engaged at the instep region, the first heel and/or ankle support chamber is engaged at a lateral side of the heel-containing region, and the second heel and/or ankle support chamber is engaged at a medial side of the heel-containing region.

Clause 89. The footwear upper according to Clause 88, wherein the one or more component parts of the footwear upper base includes a first component part, and wherein at least a portion of the bladder is engaged with the first component part.

Clause 90. The footwear upper according to Clause 89, wherein the portion of the bladder engaged with the first component part is engaged in an adhesive free manner.

Clause 91. The footwear upper according to Clause 89 or 90, wherein the first component part is a knit component.

Clause 92. An article of footwear, comprising: (i) a footwear upper according to any one of Clauses 88 to 91; and (ii) a sole structure engaged with the footwear upper.

What is claimed is:

1. An article of footwear, comprising:
a footwear upper base formed from one or more component parts and including: (i) an instep region, (ii) a heel-containing region, and (iii) a foot-receiving opening;
a bladder including: (i) a first instep chamber engaged with the instep region of the footwear upper base, the first instep chamber including a first major surface located at the instep region, (ii) a first heel and/or ankle support chamber engaged with the heel-containing region of the footwear upper base, and (iii) a first fluid line connecting the first instep chamber and the first heel and/or ankle support chamber, wherein the first fluid line extends along and proximate to a first side edge of the foot-receiving opening;
a sole structure engaged with the footwear upper base; and
a strap member having a first end engaged with at least one of the footwear upper base or the sole structure on a first side of the article of footwear, wherein the strap member includes a first strap portion that (i) extends across the first major surface and (ii) is configured to apply compressive force to the first instep chamber when the strap member is tightened to thereby move fluid through the first fluid line to the first heel and/or ankle support chamber.

2. The article of footwear according to claim 1, further comprising a strap retaining device located on a second side of the article of footwear, wherein the strap member engages the strap retaining device to apply the compressive force.

3. The article of footwear according to claim 2, wherein the strap retaining device includes a strap direction change device, and wherein the strap member extends from the first end, across the first major surface, engages the strap direction change device, extends across the instep region, and back to the first side of the article of footwear.

4. The article of footwear according to claim 3, wherein the strap direction change device is mounted to a second strap, and wherein the second strap is engaged with at least one of the footwear upper base or the sole structure at the second side of the article of footwear.

5. The article of footwear according to claim 1, further comprising:
a strap direction change device located on a second side of the article of footwear; and
a strap securing system located on the first side of the article of footwear, wherein the strap member extends from the first end, across the first major surface, engages the strap direction change device, extends across the instep region, back to the first side of the article of footwear, and connects with the strap securing system.

6. The article of footwear according to claim 1, wherein the bladder further includes a second heel and/or ankle support chamber and a second fluid line connecting the first heel and/or ankle support chamber and the second heel and/or ankle support chamber, wherein the compressive force applied when the strap member is tightened further moves fluid through the second fluid line to the second heel and/or ankle support chamber.

7. An article of footwear comprising:
a footwear upper base formed from one or more component parts and including: (i) an instep region and (ii) a heel-containing region;
a bladder including: (i) a first instep chamber engaged with the instep region of the footwear upper base, the first instep chamber including a first major surface located at the instep region, (ii) a first heel and/or ankle support chamber engaged with the heel-containing region of the footwear upper base, (iii) a first fluid line connecting the first instep chamber and the first heel and/or ankle support chamber, (iv) a second heel and/or ankle support chamber, and (v) a second fluid line connecting the first heel and/or ankle support chamber and the second heel and/or ankle support chamber, wherein the second fluid line extends around a rear heel and/or ankle portion of the footwear upper base and has a transverse cross-sectional area of less than 160 mm$^2$ over at least a 20 mm length;
a sole structure engaged with the footwear upper base; and
a strap member having a first end engaged with at least one of the footwear upper base or the sole structure on a first side of the article of footwear, wherein the strap member includes a first strap portion that (i) extends across the first major surface and (ii) is configured to apply compressive force to the first instep chamber when the strap member is tightened to thereby move fluid through the first fluid line to the first heel and/or ankle support chamber and through the second fluid line to the second heel and/or ankle support chamber.

8. The article of footwear according to claim 1, wherein the bladder further includes a second instep chamber engaged with the instep region of the footwear upper base, wherein the second instep chamber includes a second major surface located at the instep region and is in fluid communication with at least one of the first fluid line and the first instep chamber, and wherein the strap member extends across the second major surface and is configured to apply compressive force to the second instep chamber when the strap member is tightened.

9. The article of footwear according to claim 8, further comprising a strap direction change device located on a second side of the article of footwear, wherein the strap member extends away from the strap direction change device in a first direction to extend across the first major surface of the first instep chamber and in a second direction to extend across the second major surface of the second instep chamber.

10. The article of footwear according to claim 9, wherein the strap direction change device is mounted to a second strap, and wherein the second strap is engaged with at least one of the footwear upper base or the sole structure at the second side of the article of footwear.

11. The article of footwear according to claim 9, further comprising a strap securing system located on the first side of the article of footwear, wherein the strap member extends from the first end, across the first major surface, engages the strap direction change device, extends across the second major surface, back to the first side of the article of footwear, and connects with the strap securing system.

12. The article of footwear according to claim 11, wherein the bladder further includes a second heel and/or ankle support chamber and a second fluid line connecting the first heel and/or ankle support chamber and the second heel and/or ankle support chamber, wherein the compressive force applied to the first instep chamber and the second instep chamber when the strap member is tightened further moves fluid through the second fluid line to the second heel and/or ankle support chamber.

13. The article of footwear according to claim 12, wherein the second fluid line extends around a rear heel and/or ankle portion of the footwear upper base.

14. The article of footwear according to claim 12, wherein the first heel and/or ankle support chamber and the second heel and/or ankle support chamber are located inside an outermost layer of the footwear upper base.

15. The article of footwear according to claim 11, wherein the bladder further includes a second heel and/or ankle support chamber and a second fluid line connecting the second instep chamber and the second heel and/or ankle support chamber, wherein the compressive force applied to the first instep chamber and the second instep chamber when the strap member is tightened further moves fluid through the second fluid line to the second heel and/or ankle support chamber.

16. The article of footwear according to claim 15, wherein the first fluid line extends along the first side of the article of footwear and the second fluid line extends along the second side of the article of footwear.

17. The article of footwear according to claim 8, wherein the bladder further includes a second heel and/or ankle support chamber and a second fluid line connecting the first heel and/or ankle support chamber and the second heel and/or ankle support chamber, wherein the compressive force applied to the first instep chamber and the second instep chamber when the strap member is tightened further moves fluid through the second fluid line to the second heel and/or ankle support chamber.

18. The article of footwear according to claim 8, wherein the bladder further includes a second heel and/or ankle support chamber and a second fluid line connecting the second instep chamber and the second heel and/or ankle support chamber, wherein the compressive force applied to the first instep chamber and the second instep chamber when the strap member is tightened further moves fluid through the second fluid line to the second heel and/or ankle support chamber.

19. The article of footwear according to claim 18, wherein the first fluid line extends along the first side of the article of footwear and the second fluid line extends along a second side of the article of footwear.

20. The article of footwear according to claim 8, wherein a portion of the first instep chamber is separated from a portion of the second instep chamber by an exposed portion of at least one of the one or more component parts of the footwear upper base.

* * * * *